(12) United States Patent
Mizoguchi et al.

(10) Patent No.: US 12,412,410 B2
(45) Date of Patent: Sep. 9, 2025

(54) IMAGE PROCESSING APPARATUS, IMAGE PROCESSING METHOD, AND NON-TRANSITORY COMPUTER-READABLE STORAGE MEDIUM STORING PROGRAM COMPRISING SETTING FIRST, SECOND AND INTERMEDIATE REGIONS IN ORDER TO EXECUTE A FIRST PROCESSING OR SECOND PROCESSING ON EACH PIXEL IN THE SET REGIONS

(71) Applicant: CANON KABUSHIKI KAISHA, Tokyo (JP)

(72) Inventors: Yoshinori Mizoguchi, Tokyo (JP); Fumitaka Goto, Tokyo (JP); Akitoshi Yamada, Kanagawa (JP); Kouta Murasawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 315 days.

(21) Appl. No.: 17/729,496

(22) Filed: Apr. 26, 2022

(65) Prior Publication Data
US 2022/0358777 A1   Nov. 10, 2022

(30) Foreign Application Priority Data
May 10, 2021   (JP) ................ 2021-079888

(51) Int. Cl.
*G06V 30/18* (2022.01)
*G06V 30/146* (2022.01)
(Continued)

(52) U.S. Cl.
CPC ...... *G06V 30/19013* (2022.01); *G06V 30/147* (2022.01); *G06V 30/18105* (2022.01)

(58) Field of Classification Search
CPC ............... G06V 10/56; G06V 30/147; G06V 30/18105; G06V 30/19013
(Continued)

(56) References Cited

U.S. PATENT DOCUMENTS 6,084,604 A   7/2000  Moriyama et al. ........ B41J 2/21
6,084,610 A   7/2000  Ozaki et al. ............. B41J 2/175
(Continued)

FOREIGN PATENT DOCUMENTS

CN   101404711   4/2009
DE   19600989    7/1996
(Continued)

OTHER PUBLICATIONS

Office Action dated Dec. 24, 2024 in counterpart Japanese Application No. 2021-079888, together with English translation thereof.

*Primary Examiner* — Chad Dickerson
(74) *Attorney, Agent, or Firm* — Venable LLP

(57) ABSTRACT

An image processing apparatus comprises an execution unit configured to selectively execute, for each pixel in each of a first region, a second region, and an intermediate region, one of a plurality of processes including first processing of generating an output value indicating that a first printing material is applied and a second printing material of a color different from a color of the first printing material is not applied, and second processing of generating an output value indicating that the second printing material is applied.

26 Claims, 18 Drawing Sheets

(51) Int. Cl.
*G06V 30/19* (2022.01)
*G06V 10/56* (2022.01)

(58) Field of Classification Search
USPC .................. 358/1.9, 1.6; 382/176; 347/15
See application file for complete search history.

(56) References Cited

U.S. PATENT DOCUMENTS

| | | | |
|---|---|---|---|
| 6,266,152 B1 | 7/2001 | Nakajima | 358/1.9 |
| 7,075,679 B2 | 7/2006 | Goto et al. | 358/3.01 |
| 7,274,491 B2 | 9/2007 | Yamada et al. | 358/3.06 |
| 7,342,684 B2 | 3/2008 | Imafuku et al. | 358/1.9 |
| 7,643,178 B2 | 1/2010 | Yamada et al. | 358/3.06 |
| 7,912,280 B2 | 3/2011 | Miyagi et al. | 382/162 |
| 8,139,849 B2 | 3/2012 | Miyagi et al. | 382/162 |
| 8,482,804 B2 | 7/2013 | Hashii et al. | 358/3.27 |
| 8,498,016 B2 | 7/2013 | Goto et al. | 358/1.9 |
| 8,616,668 B2 | 12/2013 | Saito et al. | 347/15 |
| 8,899,715 B2 | 12/2014 | Saito et al. | 347/15 |
| 8,934,140 B2 | 1/2015 | Hori et al. | 358/2.1 |
| 8,953,234 B2 | 2/2015 | Iguchi et al. | 358/518 |
| 9,055,252 B2 | 6/2015 | Miyake et al. | H04N 1/60 |
| 9,111,204 B2 | 8/2015 | Fujita et al. | H04N 1/644 |
| 9,162,477 B2 | 10/2015 | Ikeda et al. | B41J 2/2146 |
| 9,245,211 B2 | 1/2016 | Kakuta | G06K 15/1881 |
| 9,623,671 B2 | 4/2017 | Yamada et al. | B41J 2/2103 |
| 9,692,944 B2 | 6/2017 | Goto et al. | B41J 2/2139 |
| 9,694,598 B2 | 7/2017 | Ishikawa et al. | B41J 2/2142 |
| 9,734,585 B2 | 8/2017 | Kakuta | G06V 10/758 |
| 10,022,983 B2 | 7/2018 | Yamada et al. | H04N 1/6041 |
| 10,748,246 B2 | 8/2020 | Hashii et al. | G06T 1/0007 |
| 11,323,576 B2 | 5/2022 | Kagawa et al. | H04N 1/6058 |
| 2007/0242096 A1* | 10/2007 | Baba | G06K 15/107 347/19 |
| 2007/0263256 A1* | 11/2007 | Sakaue | H04N 1/40062 358/1.9 |
| 2011/0019238 A1 | 1/2011 | Couwenhoven et al. | H04N 1/409 |
| 2011/0316920 A1 | 12/2011 | Torigoe et al. | 347/14 |
| 2012/0081443 A1 | 4/2012 | Ono et al. | 347/15 |
| 2021/0218865 A1 | 7/2021 | Tsuchiya et al. | H04N 1/48 |
| 2022/0253655 A1 | 8/2022 | Abe et al. | C09D 11/38 |

FOREIGN PATENT DOCUMENTS

| | | |
|---|---|---|
| JP | H06-206370 | 7/1994 |
| JP | H09-270929 | 10/1997 |
| JP | 10086503 A * | 4/1998 |
| JP | H10-086503 | 4/1998 |
| JP | 2015-099997 | 5/2015 |
| JP | 2015-220506 | 12/2015 |

* cited by examiner

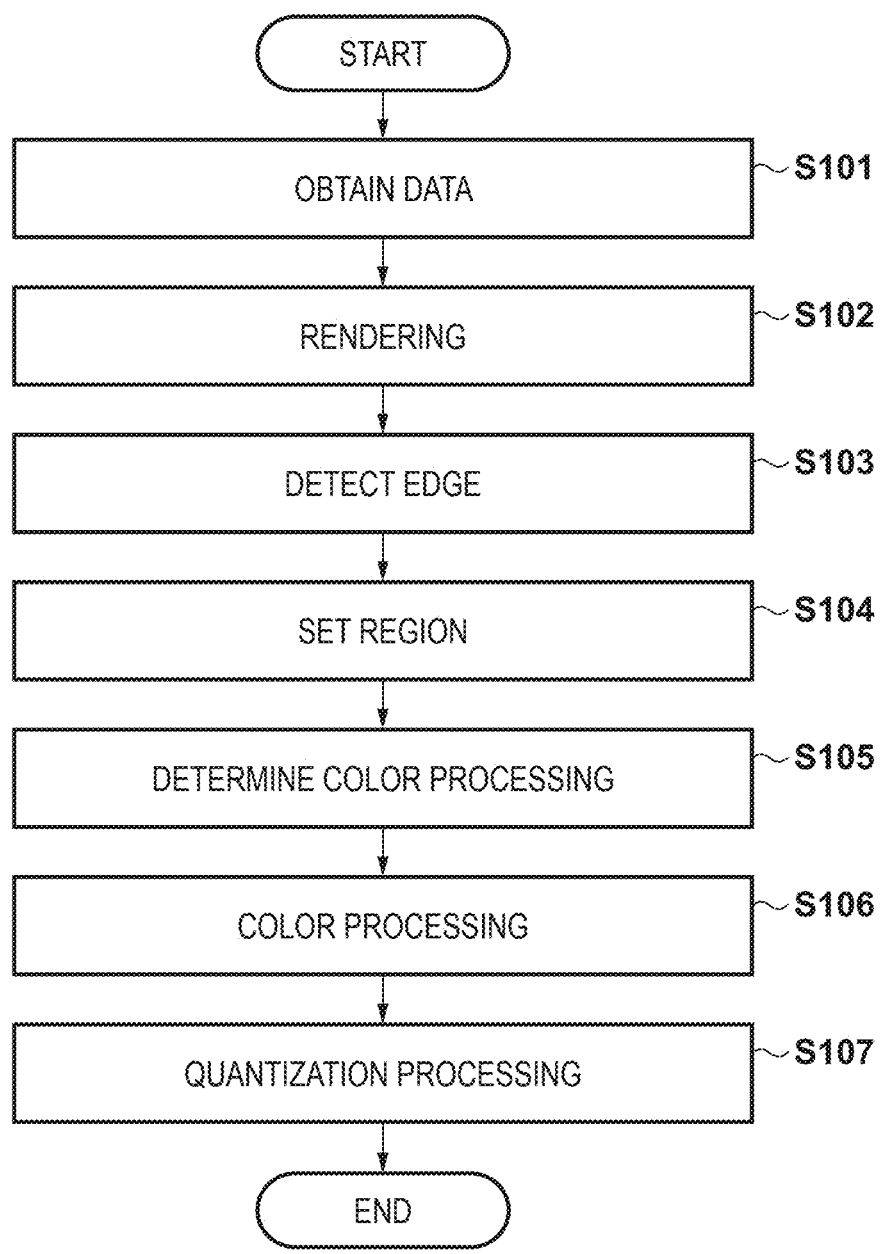

FIG. 6A
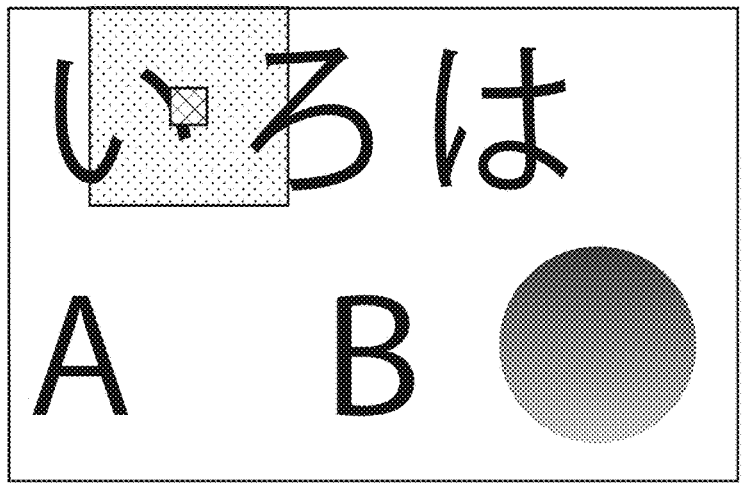
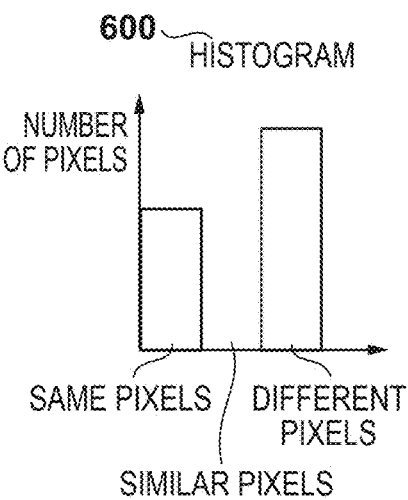
FIG. 6B
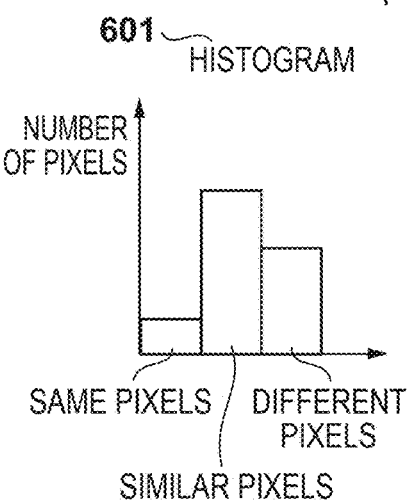
FIG. 6C
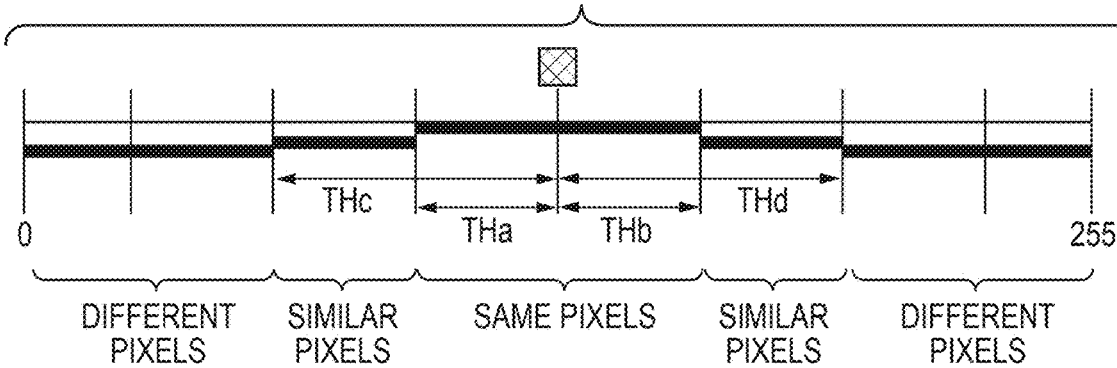

FIG. 8A
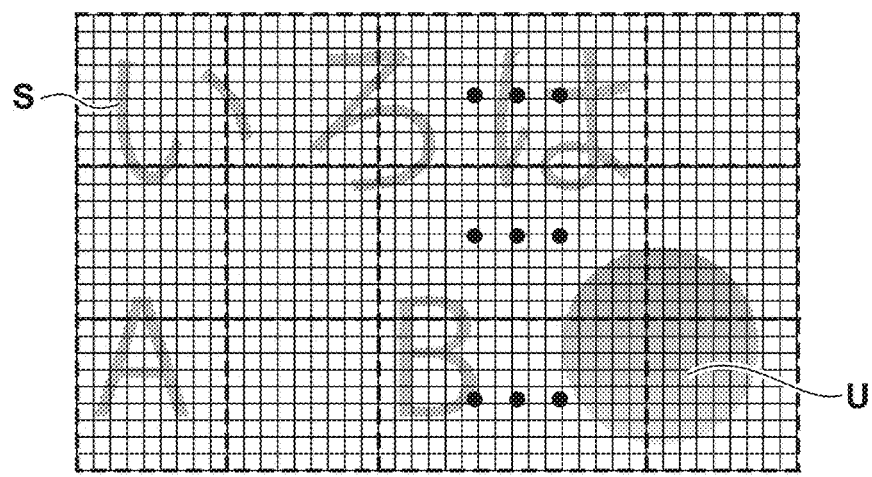
FIG. 8B
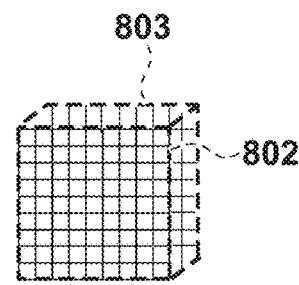
FIG. 8C
FIG. 8D

☒ EDGE REGION —1002
☐ DISTANCE OF 1 FROM EDGE —1003
▨ DISTANCE OF 2 FROM EDGE —1004
▨ NON-EDGE REGION —1005

■ EXECUTE COLOR PROCESSING 1 —1007
▨ EXECUTE COLOR PROCESSING 2 —1008

HISTOGRAM

HISTOGRAM

HISTOGRAM

HISTOGRAM

|  | PIXEL S | PIXEL T | PIXEL U | PIXEL V | PIXEL W | PIXEL X | PIXEL Y | PIXEL Z |
|---|---|---|---|---|---|---|---|---|
| CHARACTER OBJECT | ○ | ○ | ○ | × | × | × | ○ | × |
| EDGE | ○ | ○ | ○ | ○ | ○ | ○ | × | × |
| DISTANCE FROM EDGE | 0 | 1 | 2 | 0 | 1 | 2 | — | — |

| 25 | 43 | 17 | 67 | 8  | 48 | 26 | 41 | 14 |
|----|----|----|----|----|----|----|----|----|
| 50 | 1  | 35 | 51 | 29 | 71 | 3  | 61 | 49 |
| 16 | 70 | 64 | 5  | 46 | 21 | 57 | 18 | 30 |
| 55 | 78 | 22 | 69 | 54 | 75 | 39 | 59 | 7  |
| 36 | 12 | 74 | 27 | 0  | 62 | 11 | 53 | 68 |
| 24 | 65 | 37 | 79 | 38 | 28 | 80 | 40 | 19 |
| 45 | 56 | 4  | 34 | 20 | 63 | 76 | 2  | 44 |
| 66 | 23 | 77 | 52 | 72 | 6  | 58 | 73 | 31 |
| 9  | 33 | 42 | 13 | 32 | 47 | 15 | 60 | 10 |

FIG. 16

IMAGE PROCESSING APPARATUS, IMAGE PROCESSING METHOD, AND NON-TRANSITORY COMPUTER-READABLE STORAGE MEDIUM STORING PROGRAM COMPRISING SETTING FIRST, SECOND AND INTERMEDIATE REGIONS IN ORDER TO EXECUTE A FIRST PROCESSING OR SECOND PROCESSING ON EACH PIXEL IN THE SET REGIONS

BACKGROUND OF THE INVENTION

Field of the Invention

The present invention relates to an image processing apparatus for performing image processing, an image processing method, and a non-transitory computer-readable storage medium storing a program.

Description of the Related Art

A printer used in an office is required to perform optimum color processing for each object included in print data. For example, if the object is a character, it is suitable to perform color processing for printing gray information (information of R=G=B) by only black ink to enhance the sharpness of edges. For example, if the object is an image or graphics, it is suitable to perform color processing for printing gray information by a mixed color of cyan ink, magenta ink, and yellow ink to improve the granularity and tonality. Japanese Patent Laid-Open No. 09-270929 describes gray compensation processing of reproducing gray by a single color of a black printing material.

On the other hand, Japanese Patent Laid-Open No. 2015-220506 describes a technique of detecting edge pixels existing in a photograph and edge pixels of a character or a line. Furthermore, Japanese Patent Laid-Open No. 2015-099997 describes execution of processing closer to photographic processing for a character pixel of the same color as that of a photographic pixel as the pixel is closer to the photographic pixel.

SUMMARY OF THE INVENTION

The present invention provides an image processing apparatus capable of suppressing degradation of the image quality of an object included in an image, an image processing method, and a non-transitory computer-readable storage medium storing a program.

The present invention in one aspect provides an image processing apparatus comprising: an acquisition unit configured to acquire multi-gradation image data; a region setting unit configured to set, in the image data acquired by the acquisition unit, a first region, a second region that does not contact the first region, and an intermediate region located between the first region and the second region; and an execution unit configured to selectively execute, for each pixel in each of the first region, the second region, and the intermediate region set by the region setting unit, one of a plurality of processes including first processing of generating an output value indicating that a first printing material is applied and a second printing material of a color different from a color of the first printing material is not applied, and second processing of generating an output value indicating that the second printing material is applied, wherein a ratio of pixels, for which the first processing is executed, included in the first region is higher than a ratio of pixels, for which the first processing is executed, included in the second region, and is higher than a ratio of pixels, for which the first processing is executed, included in the intermediate region, a ratio of pixels, for which the second processing is executed, included in the second region is higher than a ratio of pixels, for which the second processing is executed, included in the first region, and is higher than a ratio of pixels, for which the second processing is executed, included in the intermediate region, and a ratio of pixels for which the first processing is executed at a first position is higher than a ratio of pixels for which the first processing is executed at a second position farther away from the first region than the first position in the intermediate region, and a ratio of pixels for which the second processing is executed at the second position is higher than a ratio of pixels for which the second processing is executed at the first position in the intermediate region.

According to the present invention, it is possible to suppress degradation of image quality.

Further features of the present invention will become apparent from the following description of exemplary embodiments with reference to the attached drawings.

BRIEF DESCRIPTION OF THE DRAWINGS

FIG. 3 is a flowchart illustrating image processing;

FIGS. 6A to 6C are views for explaining the edge detection processing;

FIGS. 8A to 8D are views for explaining probability masks;

FIG. 16 is a view for explaining the probability mask;

DESCRIPTION OF THE EMBODIMENTS

Figure 1:
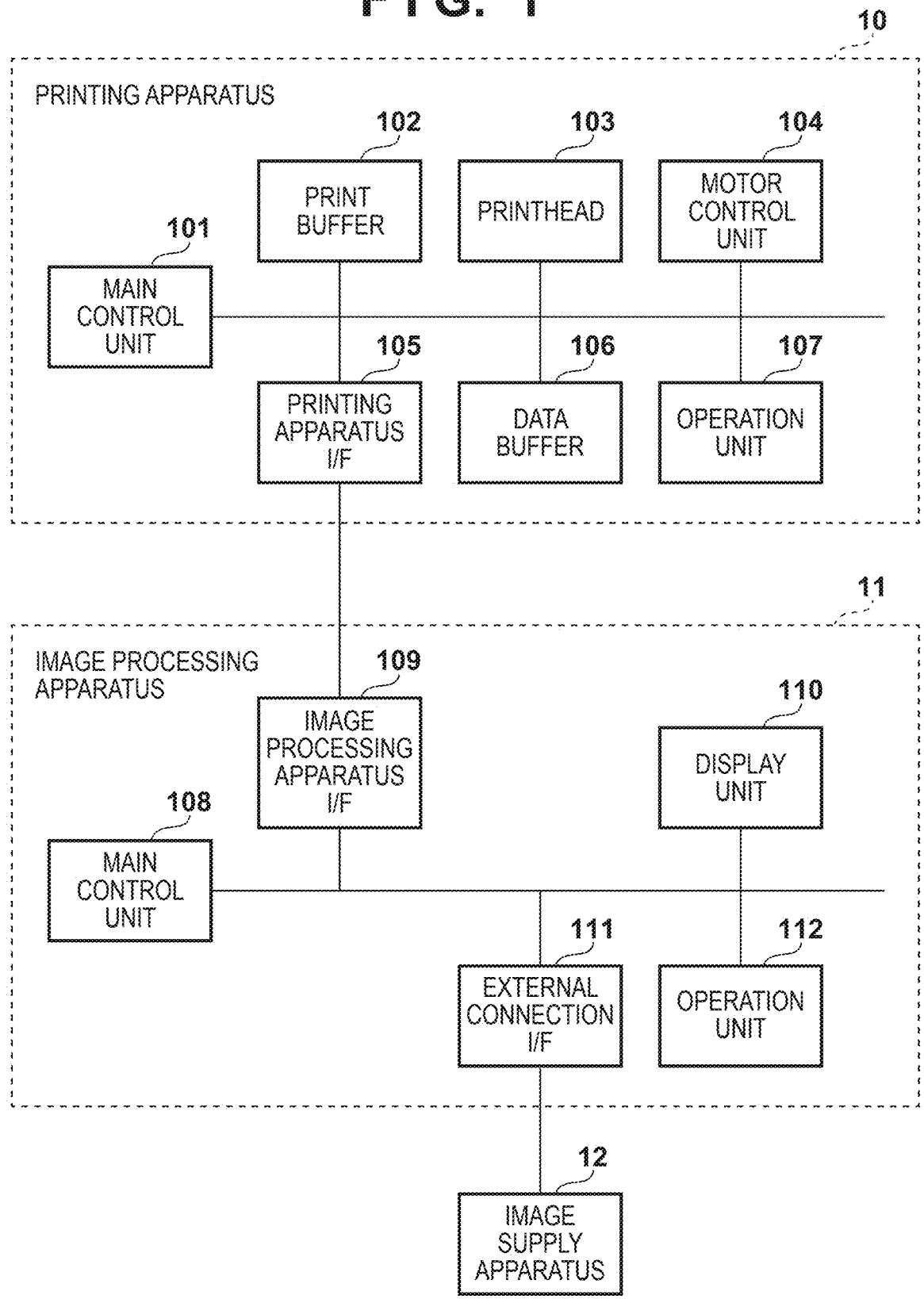
FIG. 1 is a block diagram showing the control arrangement of an inkjet printing system.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

In an intermediate region between an edge region of an object and a non-edge region which is determined not to be an edge region, it is possible to suppress an abrupt color change caused by mixing a plurality of different color processes. If inks of different properties are used in the different color processes, the inks having the different properties overlap each other, which may degrade image quality. To cope with this, it is required to suppress degradation of image quality over the edge region, the intermediate region, and the non-edge region.

According to one aspect of the following embodiments, it is possible to suppress degradation of the image quality of an object included in an image.

First Embodiment

This embodiment will describe a system that performs color processing for each pixel in an image processing apparatus, and causes an inkjet printing apparatus to execute printing based on data having undergone the color processing.

FIG. 1 is a block diagram showing an example of the arrangement of an inkjet printing system. The inkjet printing system is formed by including an image supply apparatus 12, an image processing apparatus 11, and an inkjet printing apparatus 10 (to be simply referred to as a printing apparatus hereinafter). Image data supplied from the image supply apparatus 12 such as a PC or a smartphone undergoes predetermined image processing by the image processing apparatus 11, and is then sent to the printing apparatus 10, thereby printing an image on a print medium such as a print sheet.

In the printing apparatus 10, a main control unit 101 comprehensively controls the overall printing apparatus 10, and is formed by including a CPU, a ROM, and a RAM. A print buffer 102 stores, as raster data, data before transfer to printheads 103. Each printhead 103 includes a plurality of nozzles capable of discharging ink droplets, and discharges ink droplets from the respective nozzles based on the image data stored in the print buffer 102. In this embodiment, for example, nozzle arrays that discharge ink droplets of four colors of cyan (C), magenta (M), yellow (Y), and black (Bk) are arrayed on the printheads 103, respectively. A motor control unit 104 controls a motor that drives a roller. The roller is, for example, a feeding roller for picking up a sheet, or a discharge roller for discharging a printed sheet to the outside. For example, control by the motor control unit 104 is performed in control of the position of a sheet for making an ink droplet land at a correct position on a sheet surface, or control of the start/stop of a carriage on which the printheads 103 are mounted. An interface (I/F) 105 is an interface for transmitting/receiving data to/from the image processing apparatus 11. Data received from the image processing apparatus 11 via the I/F 105 is temporarily stored in a data buffer 106, and converted into raster data at the time of execution of printing, and the raster data is stored in the print buffer 102. An operation unit 107 includes hardware keys, and is configured to accept an operation from a user.

In the image processing apparatus 11, a main control unit 108 comprehensively controls the overall image processing apparatus 11, and is formed by including a CPU, a ROM, and a RAM. An I/F 109 is an interface for transmitting/receiving data to/from the printing apparatus 10. A display unit 110 is a display unit such as a panel for displaying various user interface screens. An operation unit 112 includes hardware keys, and is configured to accept an operation from the user. Note that like a touch panel or the like, the display unit 110 and the operation unit 112 may be formed integrally. An external connection I/F 111 is a component for allowing communication with an external apparatus via a network. The external connection I/F 111 has an arrangement corresponding to the medium of the network. For example, the external connection I/F 111 has an arrangement capable of performing wireless communication with the image supply apparatus 12 as a smartphone by Bluetooth® or Wi-Fi.

The image processing apparatus 11 and the printing apparatus 10 are shown as separate apparatuses in FIG. 1 but may be formed integrally like an MFP (Multi Functional Printer). In this case, the main control unit 101 controls the printing apparatus 10 under the control of the main control unit 108. The following description assumes that the image processing apparatus 11 and the printing apparatus 10 are formed integrally, and the image processing apparatus 11 and the printing apparatus 10 will collectively be referred to as the image processing apparatus 11 hereinafter.

Figure 2:
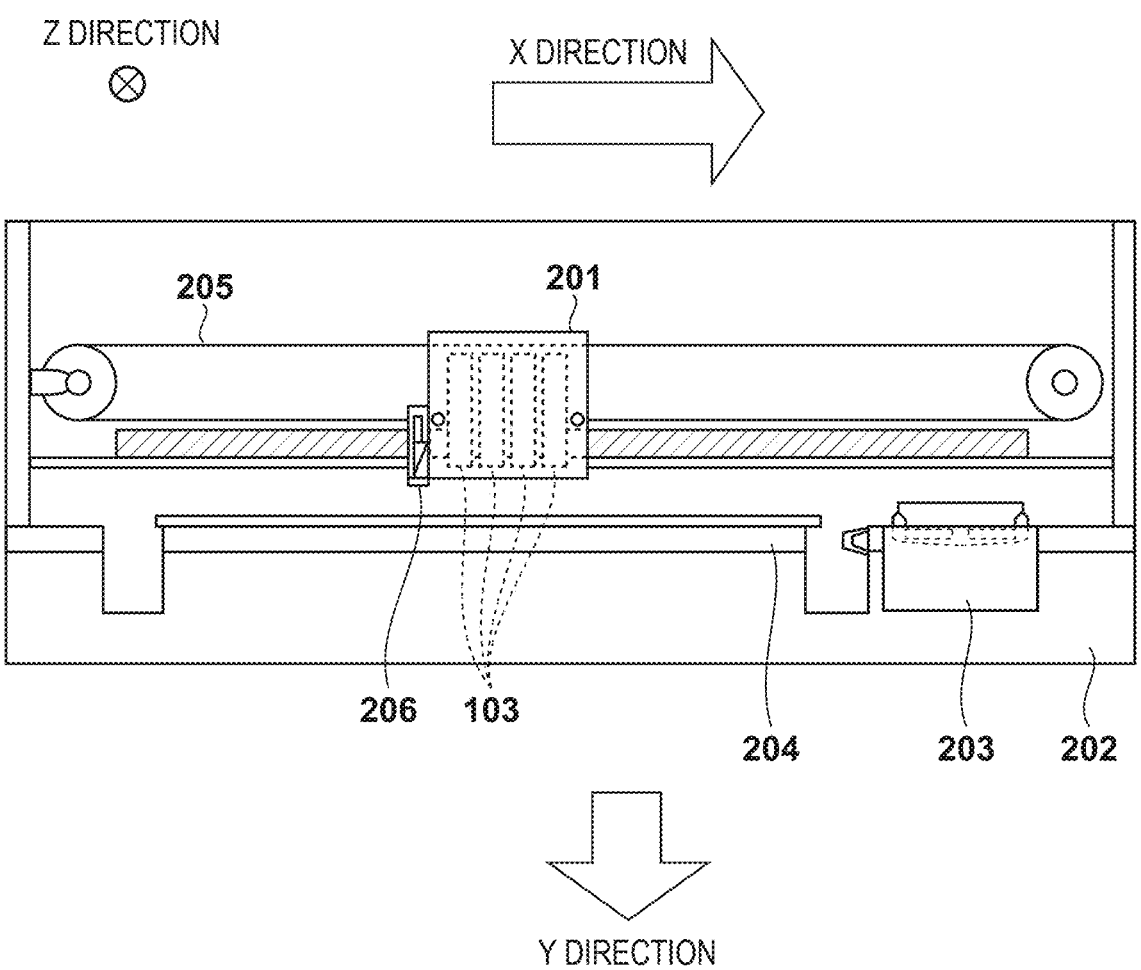
FIG. 2 is a view for explaining an arrangement on the periphery of the print unit of an inkjet printing apparatus.

FIG. 2 is a side sectional view for explaining an arrangement on the periphery of the print unit of the printing apparatus 10 according to this embodiment. A carriage 201 on which an optical sensor 206 and the four printheads 103 each including the nozzle array are mounted is configured to be movable reciprocally in the X direction in FIG. 2 by the driving force of a carriage motor transmitted via a belt 205. For example, a nozzle length corresponding to discharge of each ink in the printhead 103 is the same for all the ink colors. In this case, the sheet width with which ink droplets can land on the sheet surface by one scan is the same for all the ink colors. Inks used for the printheads 103 are, for example, cyan ink, magenta ink, yellow ink, and black ink sequentially from the right side in FIG. 2. In this case, in a scan in the X direction, if ink droplets of the four colors are discharged to the same pixel of a sheet, cyan ink, magenta ink, yellow ink, and black ink are discharged in this order.

When the printheads 103 discharge ink droplets in the Z direction orthogonal to the drawing in accordance with print data while the carriage 201 moves in the X direction with respect to the sheet, an image for one scan is printed on the sheet arranged on a platen 204. Upon the end of one print scan, the sheet is conveyed in the Y direction (conveyance direction) orthogonal to the X direction in FIG. 2 by a distance corresponding to the print width of one scan. When the print scan and the conveyance operation are alternately repeated a plurality of times, the image is gradually formed on the sheet. When a sheet detection operation is performed while the optical sensor 206 moves together with the carriage 201, it is determined whether the sheet exists on the platen 204. At a position deviating from the platen 204 in the scan region of the carriage 201, a recovery unit 203 for performing maintenance processing of the printheads 103 is formed.

FIG. 3 is a flowchart illustrating image processing of image data in the image processing apparatus 11. The processing shown in FIG. 3 is implemented when the CPU of the main control unit 108 reads out a program stored in the ROM and executes it. In this case, in each image processing, hardware such as an ASIC or GPU may be used.

In step S101, the main control unit 108 receives, from the image supply apparatus 12, data to be printed. The data received in step S101 is data formed by including a print command for an object, and is, for example, PDL (Page Description Language) data. In step S102, the main control unit 108 executes rendering processing for the data received in step S101. The rendering processing generates drawing image data (to also be referred to as bitmap data hereinafter) and object image data. The object image data is image data including pixels, the numbers of which in the vertical and horizontal directions are equal to those of the bitmap data, and holds, as object information, a value indicating the presence/absence of an object in each pixel and the type of object. In step S103, the main control unit 108 executes edge detection processing for the bitmap data. The edge detection processing determines the presence/absence of an edge by setting, as an edge detection area, a rectangular area of a predetermined number of X pixels × a predetermined number of Y pixels in the image of the bitmap data.

Figure 4A:
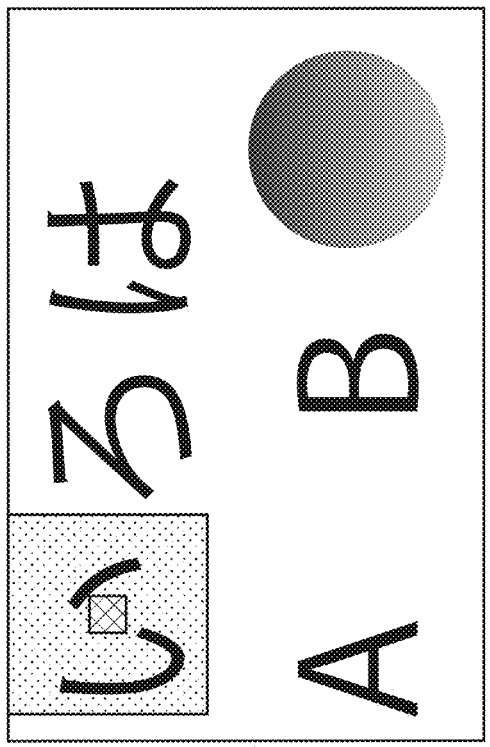
FIGS. 4A to 4D are views for explaining edge detection processing.
Figure 4C:
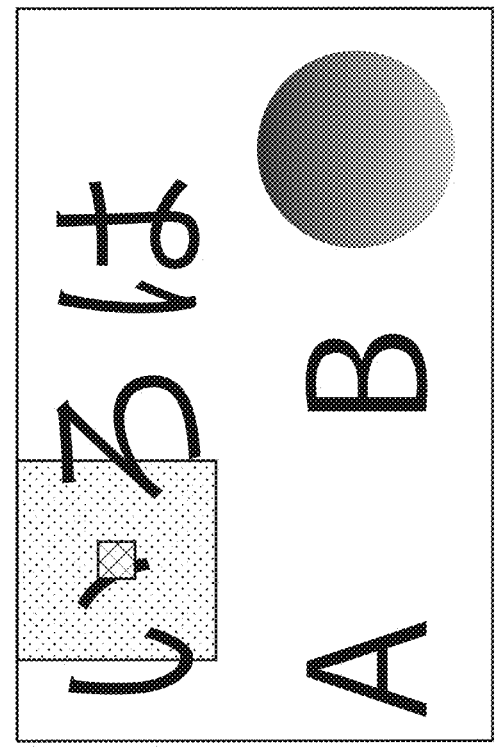
Figure 4B:
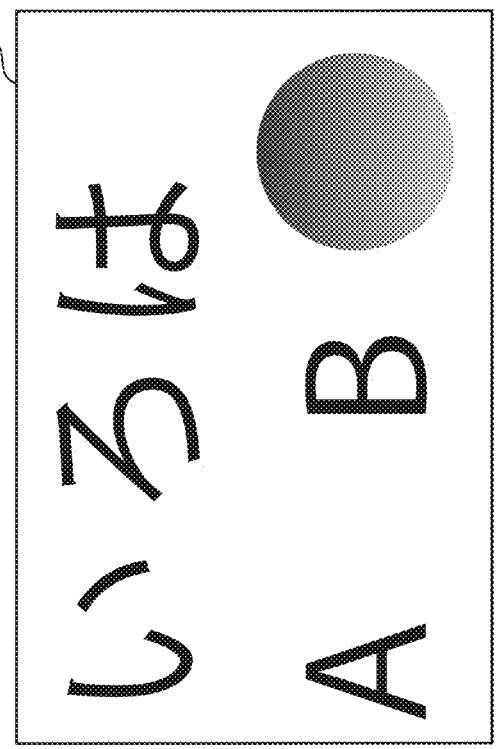
Figure 4D:
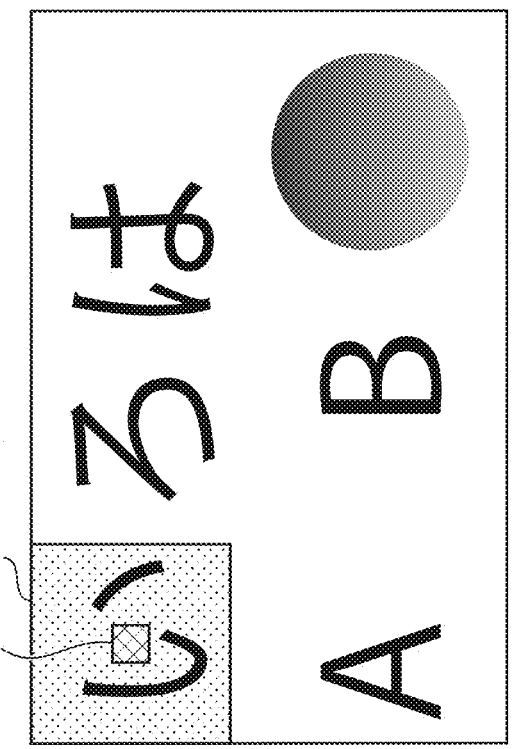

An example of setting of an edge detection area will be described with reference to FIGS. 4A and 4D. An image 400 shown in FIG. 4A indicates the image of the bitmap data as multi-gradation image data obtained by rendering in step S102. A region 401 shown in FIG. 4B is an edge detection area centering a pixel 402 indicated by a thick frame. Note that the pixel 402 need not be the central pixel of the region 401.

In this embodiment, the presence/absence of an edge in the region 401 is determined. The edge detection result is associated with the pixel 402, and the entire image 400 is scanned while shifting the pixel 402. That is, after FIG. 4B, the edge detection area 401 moves, as shown in FIGS. 4C and 4D. Then, by scanning the image 400 so that the edge detection areas 401 overlap each other between the sequences of the edge detection processing, the presence/absence of an edge is determined for all the pixels of the image 400.

Figure 5A:
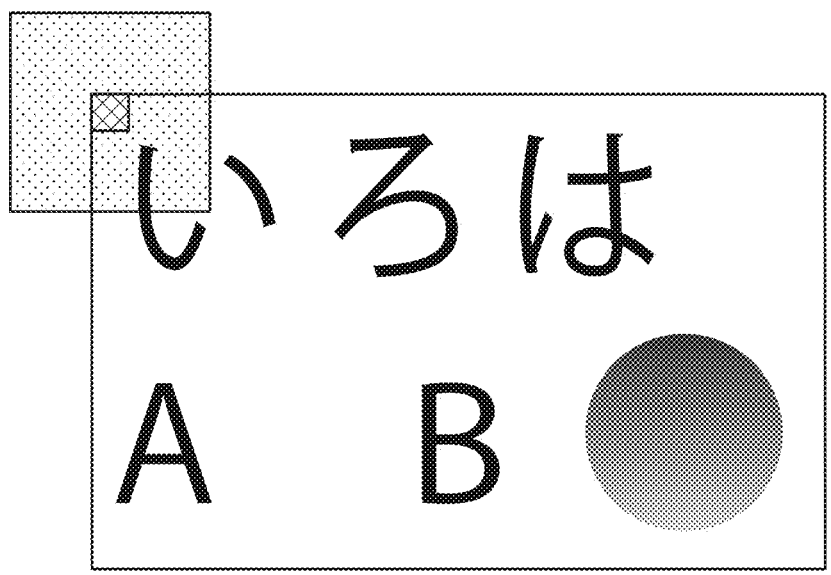
FIGS. 5A and 5B are views for explaining the edge detection processing.
Figure 5B:
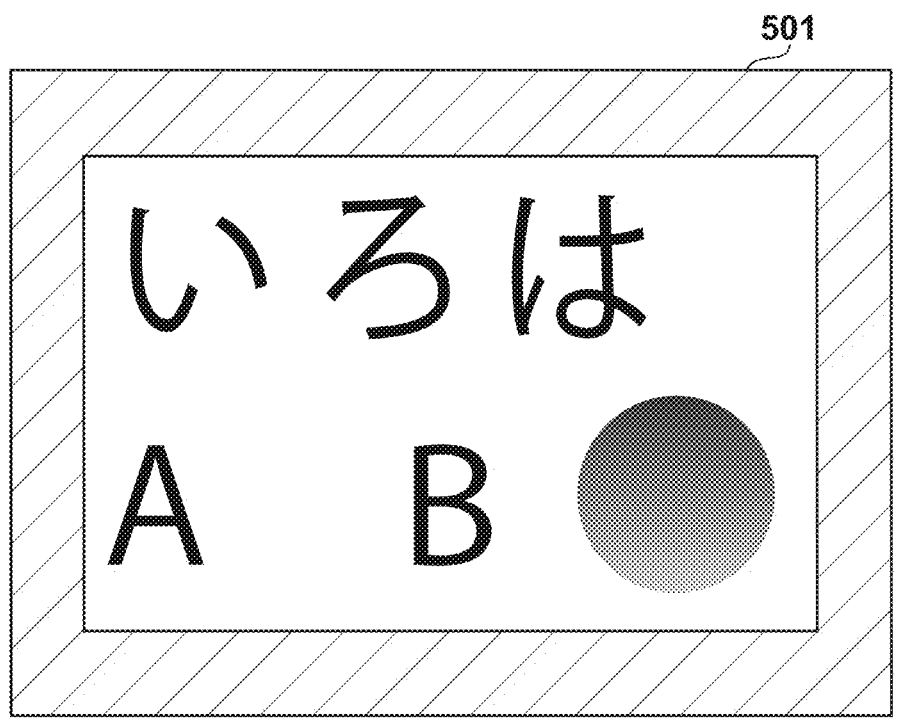

As shown in FIG. 5A, there exists a pixel for which the presence/absence of an edge cannot be determined unless the edge detection area 401 extends outside the image 400. For such pixel, the presence/absence of an edge is determined by setting dummy pixels in a region 501 indicated by the outer frame of the image 400, as shown in FIG. 5B. The dummy pixel is set with such pixel value that the edge detection rate of peripheral pixels does not change unnaturally, and for example, a paper white value of R=G=B=255 is set. Note that if object information is used to determine the presence/absence of an edge, object information as dummy information may be set.

In this embodiment, a generally known method may be used as an edge detection algorithm, and for example, the Canny method is used. The Canny method obtains the gradient and direction of an edge from two differential images by acquiring a result of applying a first differential filter to the edge detection area 401 in the vertical and horizontal directions. The gradient direction is acquired as an orthogonal direction with respect to the edge, and thus an edge in the vertical direction, an edge in the horizontal direction, or an edge in the oblique direction can be acquired. By comparing a gradient amount with a threshold, edge likelihood may be determined.

The accuracy of edge likelihood may be improved by combining methods of edge detection algorithms. By, for example, combining the Canny method and another method, character likelihood may be determined at the time of execution of the edge detection processing. For example, the edge detection area 401 is classified into three classes. That is, by setting the pixel 402 as a reference pixel value, classification is performed into "same pixel" whose tint is very close to the reference pixel value, "similar pixel" whose tint is close to the reference pixel value, and "different pixel" whose tint is different from the reference pixel value. As the tint, RGB information, YCbCr information, or information of one channel of these pieces of information may be used.

As a classification method, for example, as shown in FIG. 6C, threshold ranges THa, THb, THc, and THd of a predetermined pixel value are set with respect to the reference pixel value. Then, pixels included in the threshold ranges THa and THb are classified as "same pixels". Pixels which are not "same pixels" among the pixels included in the threshold ranges THc and THd are classified as "similar pixels". The remaining pixels are classified as "different pixels". Note that the threshold ranges THa, THb, THc, and THd may be changed for each piece of color information. For example, different threshold ranges may be set for each of R, G, and B. Furthermore, classification may be performed using a plurality of channels. If, for example, all of R information, G information, and B information are included in the threshold range THa or THb, the pixel may be classified as "same pixel".

FIGS. 6A and 6B each show an example of the classification result. FIG. 6A shows a state in which the edge detection area 401 is located in a character region. Since in the character region, the tint is apparently different between the foreground portion which is a character and a background portion which is not a character, a histogram result 600 indicates that the numbers of "same pixels" and "different pixels" are large and the number of "similar pixels" is small. On the other hand, FIG. 6B shows a state in which the edge detection area 401 is located in a graphic region. Since in the graphic region, information of a foreground which is graphics changes in tint stepwise (gradation), a histogram result 601 indicates that the number of "similar pixels" is large and the numbers of "same pixels" and "different pixels" are small. That is, if the numbers of same pixels and different pixels in the edge detection area 401 are large and the number of similar pixels is small, it can be determined that character edge likelihood is higher. Then, a threshold may be set for each number of pixels, thereby detecting a character edge. For example, a character edge may be detected based on whether to satisfy a condition given by:

$$\text{same pixel index} > TH\_same \,\&\&\, \text{similar pixel index} < TH\_near \,\&\&\, \text{different pixel index} > TH\_other \qquad (1)$$

After step S103 of FIG. 3, in step S104, the main control unit 108 executes region setting processing. In this embodiment, in the region setting processing, an edge region, an intermediate region, and a non-edge region are set.

Figure 7A:
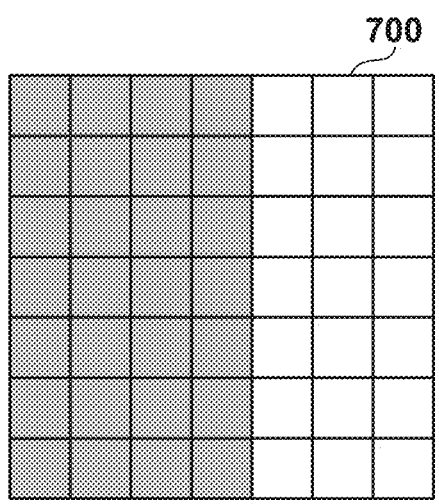
FIGS. 7A and 7B are views for explaining region setting processing.
Figure 7B:
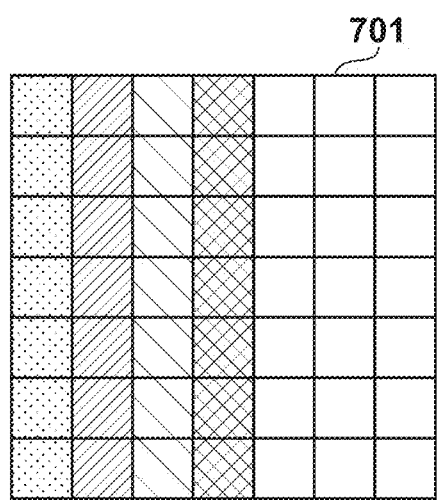

FIGS. 7A and 7B are views each showing an example of setting by the region setting processing. For example, as shown in FIG. 7A, bitmap data 700 generated in step S102 includes black/white pixel information. In step S104, the main control unit 108 generates region setting information 701 from the bitmap data 700 based on a result of detecting the presence of an edge in the vertical direction in step S103. The region setting information 701 includes pieces of information respectively indicating the edge region, the intermediate region, and the non-edge region.

Since a region 702 in the region setting information 701 corresponds to a boundary portion between the black and white pixels of the bitmap data 700, it is set as an edge region. The edge region is estimated based on the gradient and direction of the edge. A region 703 is a pixel region adjacent to the edge region, and is set as an intermediate region of a distance of 1 from the edge. A region 704 is a pixel region away from the edge region by one pixel, and is set as an intermediate region of a distance of 2 from the edge. A region 705 is a region farther away from the edge region, and is set as a non-edge region. FIG. 7B shows an example in which there exist two intermediate regions between the edge region and the non-edge region. However, the number of intermediate regions is not limited to two, and more or less intermediate regions may exist. Note that the region setting information 701 is region setting information in the black pixel region, but a region may be set in the white pixel region on the right side of the region 702.

The edge region, intermediate region, and non-edge region may be set by, for example, the following method. For example, a region "formed by pixels each of which has an edge gradient amount exceeding a given threshold by the Canny method" may be set as the edge region. Furthermore, a region "formed by pixels each of which has an edge gradient amount not exceeding the given threshold by the Canny method and for which the entire edge detection area is determined to likely be a character" is set as the intermediate region. A region "formed by pixels for which the entire edge detection area is determined not to likely be a character" may be set as the non-edge region. A region "formed by pixels each of which has an edge gradient amount exceeding the given threshold by the Canny method but for which the entire edge detection area is determined not to likely be a character" may set as the non-edge region. Furthermore, after setting the edge region, a region up to pixels away from the pixels of the edge region by X pixels may be set as the intermediate region, and a region away from the pixels of the edge region by more than X pixels may be set as the non-edge region. With respect to the distance at this time, if a distance of 1 is set when the region is separated by one pixel in each of the vertical and horizontal directions, a distance of 1 may be set for the oblique direction. If the distances from the plurality of pixels of the edge region are derived, the minimum value or average value of the distances may be adopted as the distance.

In step S105, the main control unit 108 executes color processing determination for deciding color processing to be executed for each pixel. In this embodiment, as an example, color processing 1 and color processing 2 will be described as a plurality of color processes to be executed for each pixel. Assume that color processing 1 is "color processing of generating black ink for making an edge sharp with respect to gray information". Assume also that color processing 2 is "color processing of generating ink of each of cyan, magenta, and yellow to improve the granularity and tonality with respect to gray information". The above example is merely an example, and three or more color processes may be executed.

Figure 19A:
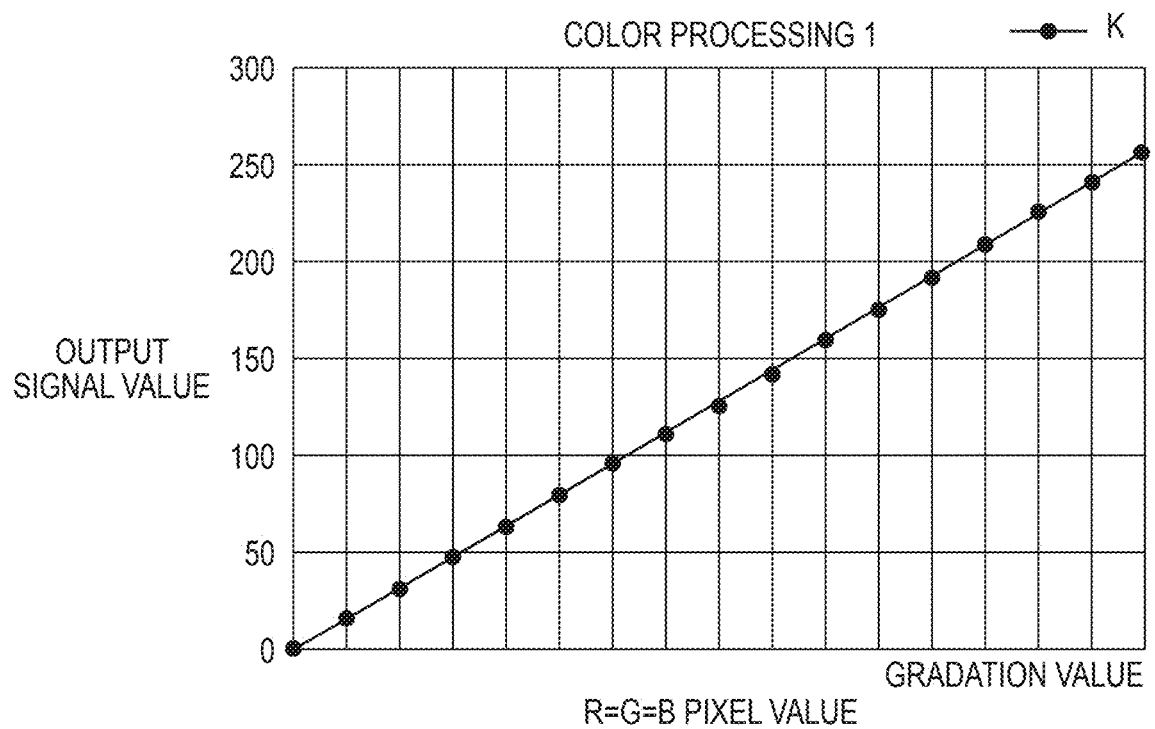
FIGS. 19A and 19B are graphs of ink generation tables.
Figure 19B:
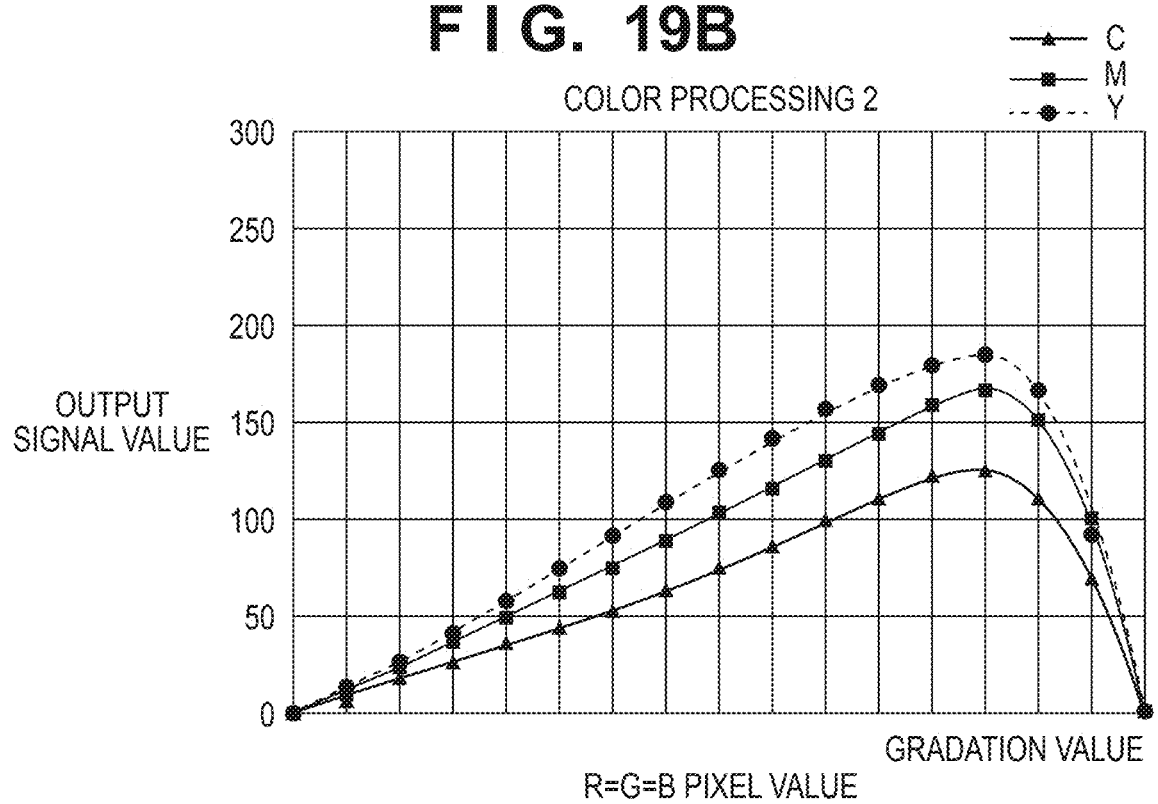

FIG. 19A shows an example of an ink generation table of color processing 1. FIG. 19B shows an example of an ink generation table of color processing 2. In the ink generation table of color processing 1, an output value is defined to generate only black ink. In the ink generation table of color processing 2, an output value is defined to generate ink of each of cyan, magenta, and yellow. The main control unit 108 acquires an in-plane probability mask for color processing determination, which is stored in advance in a storage area such as the ROM. The in-plane probability mask is mask data having a size of a predetermined number of pixels. In each pixel in a plane defined by the mask data, information of color processing to be executed is randomly set. This arrangement can decide, based on the probability, color processing to be executed for a target pixel of interest. The in-plane probability mask will simply be referred to as a probability mask hereinafter.

For example, processing of deciding which of color processing 1 and color processing 2 is to be executed for a pixel (set as a target pixel) of the intermediate region of a distance of 2 from the edge will be described. First, the main control unit 108 acquires a probability mask assigned to a region including the position of the target pixel in the image. Assignment of the probability mask to the image will be described later. Then, the main control unit 108 acquires information of color processing set at a position corresponding to the target pixel in the probability mask. The information of the color processing is, for example, information indicating color processing 1 or information indicating color processing 2. If the acquired information is information indicating color processing 1, the main control unit 108 decides color processing 1 as color processing to be executed for the target pixel. On the other hand, if the acquired information is information indicating color processing 2, the main control unit 108 decides color processing 2 as color processing to be executed for the target pixel.

When acquiring the probability mask in the above example, a probability mask designed to satisfy corresponding predetermined conditions is acquired. One of the predetermined conditions is that the number of pixels set with information indicating color processing 1 is larger than the number of pixels set with information indicating color processing 2 in the intermediate region of a distance of 1 from the edge. Another condition is that pixels set with information indicating color processing 1 and pixels set with information indicating color processing 2 are dispersed and arranged. If these conditions are satisfied, one of color processing 1 and color processing 2 may be decided for both the first target pixel included in the intermediate region of a distance of 1 from the edge and the second target pixel adjacent to the first target pixel but the probability of deciding color processing 1 for both the pixels is generally high.

On the other hand, when acquiring the probability mask in the above example, a probability mask designed to satisfy corresponding other predetermined conditions is acquired. One of the predetermined conditions is that the number of pixels set with information indicating color processing 2 is larger than the number of pixels set with information indicating color processing 1 in the intermediate region of a distance of 2 from the edge. Another condition is that pixels set with information indicating color processing 1 and pixels set with information indicating color processing 2 are dispersed and arranged. If these conditions are satisfied, one of color processing 1 and color processing 2 may be executed for both the first target pixel included in the intermediate region of a distance of 2 from the edge and the second target pixel adjacent to the first target pixel but the probability of deciding color processing 2 for both the pixels is generally high.

That is, it is possible to prevent an abrupt color change between the edge region and the intermediate region of a distance of 2 from the edge, between the intermediate region of a distance of 2 from the edge and the intermediate region of a distance of 1 from the edge, or between the intermediate region of a distance of 1 from the edge and the non-edge region. Furthermore, it is possible to prevent a plurality of color processes from being executed for one pixel.

FIG. 8A is a view showing a method of assigning a probability mask 801 to the bitmap data. As shown in FIG. 8A, the probability mask 801 may be assigned in a tile pattern. If the image size of the bitmap data is larger than the mask size of the probability mask 801, the probability mask 801 is copied on the right side and the lower side in a tile pattern, and the masks are arranged not to overlap each other without a gap. For example, two kinds of probability masks 802 and 803 are defined as the probability mask 801. The probability mask 802 is a probability mask corresponding to a region of a distance of 1 from the edge and designed to satisfy the predetermined conditions corresponding to the intermediate region of a distance of 1 from the edge. The probability mask 803 is a probability mask corresponding to a region of a distance of 2 from the edge and designed to satisfy the predetermined conditions corresponding to the intermediate region of a distance of 2 from the edge. Even if any of the probability masks 802 and 803 is used, the masks are arranged not to overlap each other without a gap, as described above. At this time, the probability masks 802 or 803 may be arranged in a tile pattern by shifting the phases or in the same phase, as shown in FIG. 8B.

FIG. 8C shows an example of the probability mask 802. At each pixel position, "1" indicates color processing 1 and "2" indicates color processing 2. Each value is arranged randomly. If the target pixel is included in the region of a distance of 1 from the edge, the probability mask 802 is referred to. If the mask value at a position, in the probability mask 802, corresponding to the pixel position of the target pixel is "1", color processing 1 is decided as color processing to be executed. If the mask value is "2", color processing 2 is decided as color processing to be executed.

FIG. 8D shows an example of the probability mask 803. At each pixel position, "1" and "2" are as described with reference to FIG. 8C. As shown in FIGS. 8C and 8D, in the probability mask 802, the probability of deciding color processing 1 is high and the probability of deciding color processing 2 is low, as compared with the probability mask 803. As described above, in this embodiment, the ratio between the mask values "1" and "2" in the probability mask is made different for each region, and a color change in the intermediate region is implemented.

In the edge region, for all the pixels, color processing 1 is decided as color processing to be executed. In the non-edge region, for all the pixels, color processing 2 is decided as color processing to be executed. Therefore, as shown in FIG. 8C, the mask values of the probability mask 802 are set so that the probability of deciding color processing 1 is higher for the intermediate region closer to the edge region among the intermediate regions. Furthermore, as shown in FIG. 8D, the mask values of the probability mask 803 are set so that the probability of deciding color processing 2 is higher for the intermediate region farther away from the edge region among the intermediate regions.

Figure 9:
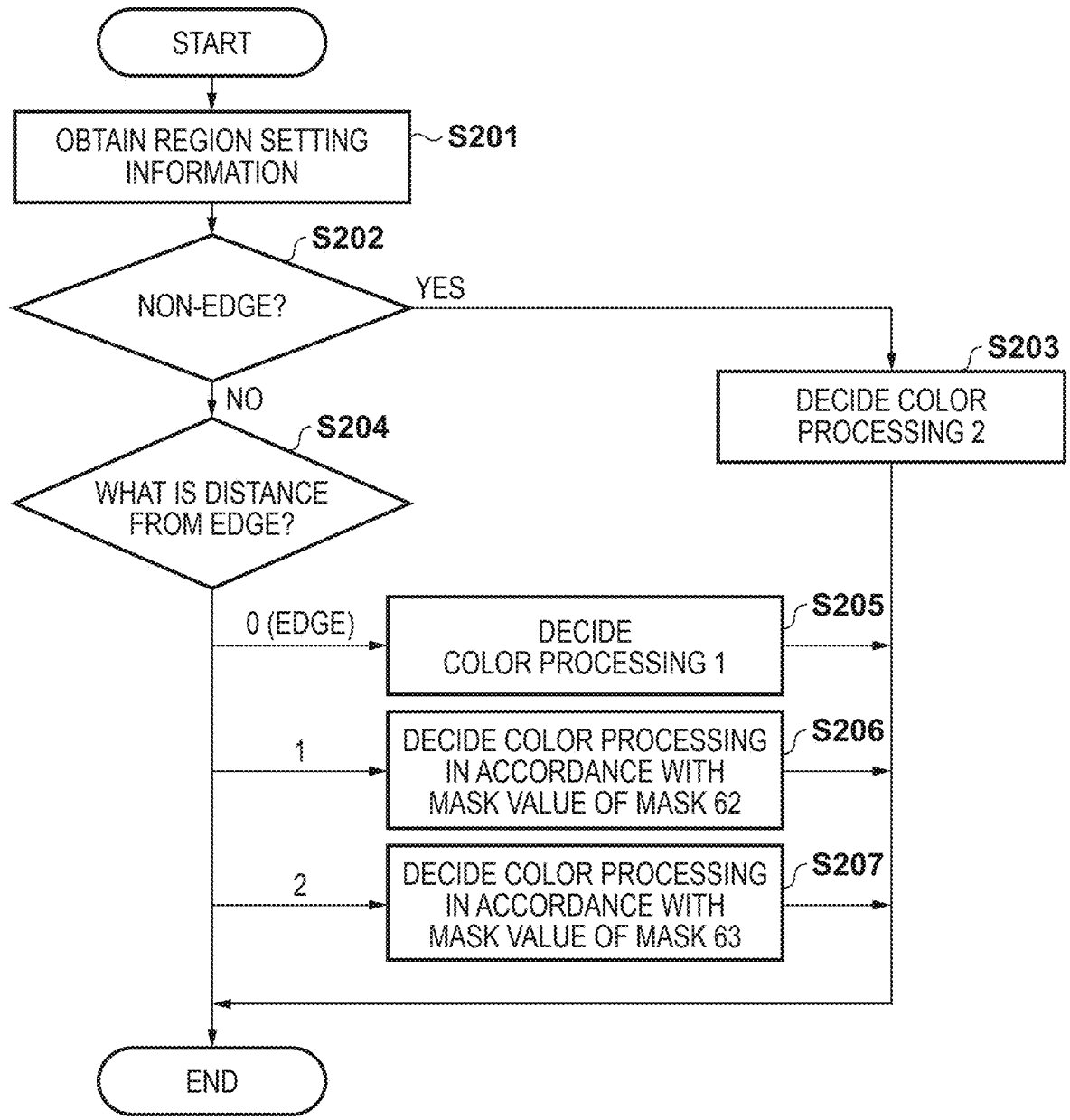
FIG. 9 is a flowchart illustrating color processing determination processing.

FIG. 9 is a flowchart illustrating color processing determination processing in step S105. The processing shown in FIG. 9 is repeatedly performed for each pixel of the image represented by the bitmap data. Processing for the target pixel of interest will be described below.

In step S201, the main control unit 108 acquires, for the target pixel, the region setting information 701 generated in step S104. In step S202, the main control unit 108 determines, based on the acquired region setting information 701, whether the target pixel is included in the non-edge region. If it is determined that the target pixel is included in the non-edge region, the process advances to step S203. In step S203, the main control unit 108 decides color processing 2 as color processing to be executed for the target pixel, and then ends the processing shown in FIG. 9.

On the other hand, if it is determined in step S202 that the target pixel is not included in the non-edge region, the main control unit 108 determines, in step S204, the distance from the edge based on the region setting information 701. At this time, if the distance of the target pixel from the edge is "0", that is, the target pixel is included in the edge region, the process advances to step S205. If the distance from the edge is "1", that is, the target pixel is included in the intermediate region of a distance of 1 from the edge, the process advances to step S206. If the distance from the edge is "2", that is, the target pixel is included in the intermediate region of a distance of 2 from the edge, the process advances to step S207.

In step S205, the main control unit 108 decides color processing 1 as color processing to be executed for the target pixel, and then ends the processing shown in FIG. 9. That is, in the edge region, color processing 1 is executed regardless of the pixel position.

In step S206, with reference to the probability mask 802, the main control unit 108 decides, as color processing to be executed for the target pixel, color processing indicated by the mask value at the position corresponding to the target pixel in the probability mask 802, and then ends the processing shown in FIG. 9. If, for example, it is determined that a target pixel S in FIG. 8A is included in the intermediate region of a distance of 1 from the edge, color processing 1 indicated by the mask value at a position T corresponding to the target pixel S is decided with reference to the probability mask 802 shown in FIG. 8C. In this way, in the intermediate region of a distance of 1 from the edge, color processing 1 or color processing 2 may be decided for the target pixel but the probability of deciding color processing 1 is generally high.

In step S207, with reference to the probability mask 803, the main control unit 108 decides, as color processing to be executed for the target pixel, color processing indicated by the mask value at the position corresponding to the target pixel in the probability mask 803, and then ends the processing shown in FIG. 9. If, for example, it is determined that a target pixel U in FIG. 8A is included in the intermediate region of a distance of 2 from the edge, color processing 2 indicated by the mask value at a position V corresponding to the target pixel U is decided with reference to the probability mask 803 shown in FIG. 8D. In this way, in the intermediate region of a distance of 2 from the edge, color processing 1 or color processing 2 may be decided for the target pixel but the probability of deciding color processing 2 is generally high.

In the processing shown in FIG. 9, for the edge region and the non-edge region, color processing 1 or color processing 2 is decided without referring to the probability mask. However, for the edge region and the non-edge region as well, color processing may be decided using the probability mask. In this case, the probability mask referred to in the case of the edge region is designed so that, for example, the ratio at which color processing 1 is set as the mask value is higher than in the probability mask 802. Furthermore, the probability mask referred to in the case of the non-edge region is designed so that, for example, the ratio at which color processing 2 is set as the mask value is higher than in the probability mask 803. As described above, color processing need not be set uniformly for the edge region and the non-edge region. That is, if the density is not reversed from the edge region to the non-edge region via the intermediate region, color processing may be decided using the probability mask in both the edge region and the non-edge region.

Referring back to FIG. 3, after step S105, in step S106, the main control unit 108 executes the color processing decided in step S105 for each pixel. In step S106, for example, pieces of ink information for four colors of cyan, magenta, yellow, and black used for printing by the printheads 103 are generated. For example, if color processing 1 is decided in step S105, ink information of black ink is generated based on the ink generation table shown in FIG. 19A, and ink information of each of cyan, magenta, and yellow is generated by setting "0" as an ink amount. Alternatively, for example, if color processing 2 is decided in step S105, ink information of each of cyan, magenta, and yellow is generated based on the ink generation table shown in FIG. 19B, and ink information of black ink is generated by setting "0" as an ink amount. The ink information is generated by a three-dimensional lookup table (LUT) from, for example, input RGB or YCbCr information. Before conversion by the three-dimensional LUT for generating ink information, conversion by the three-dimensional LUT for performing xRGB-to-dRGB conversion may be executed. In this example, xRGB indicates a color space other than the dRGB space of the printer.

Figure 10A:
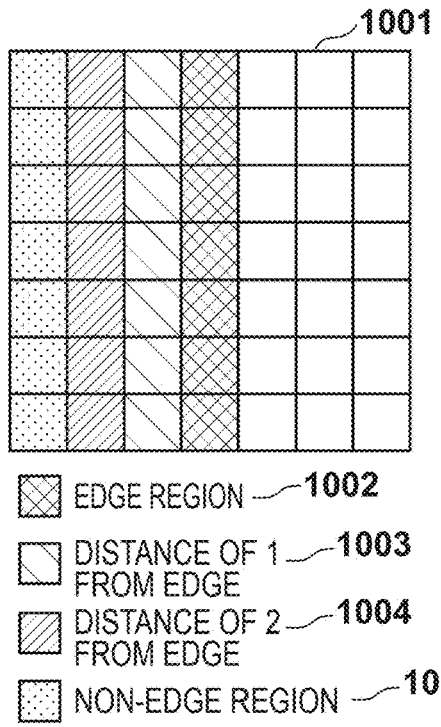
FIGS. 10A to 10F are views for explaining the distributions of pixels corresponding to respective color processes.

FIGS. 10A to 10F are views for explaining a difference between the distributions of pixels corresponding to the decided color processes in the regions. Region setting information 1001 and regions 1002 to 1005 shown in FIG. 10A are the same as the region setting information 701 and the regions 702 to 705 shown in FIG. 7, respectively. A color processing result 1006 shown in FIG. 10B visually indicates a difference between the distributions of pixels corresponding to the decided color processes in the respective regions.

Figure 10B:
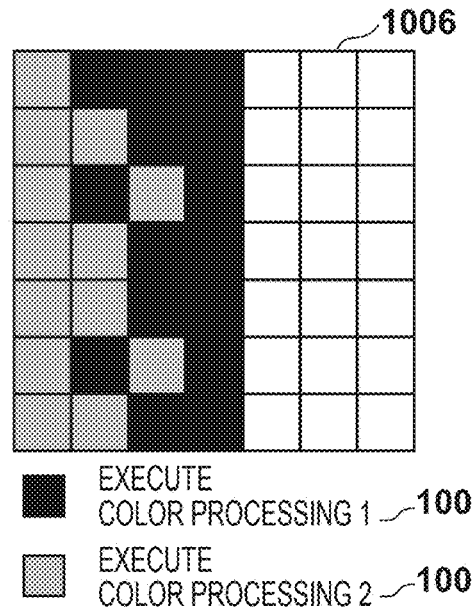
Figure 10C:
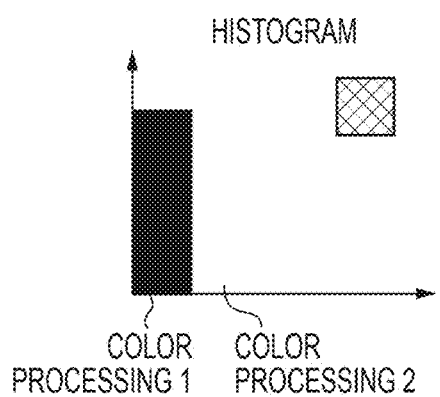
Figure 10D:
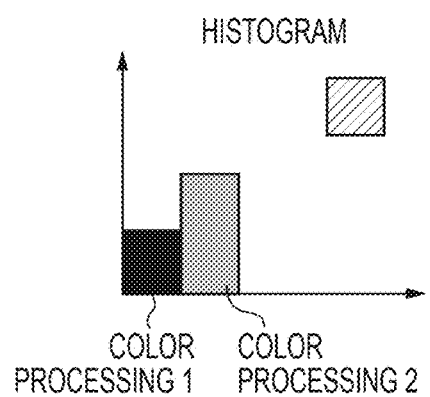
Figure 10E:
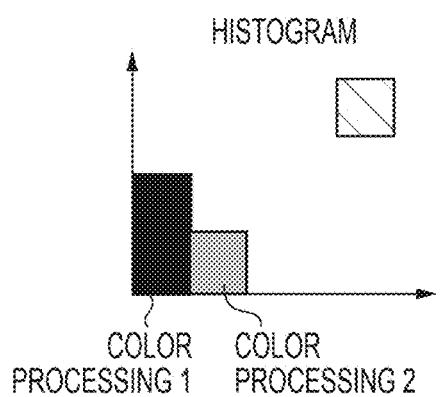
Figure 10F:
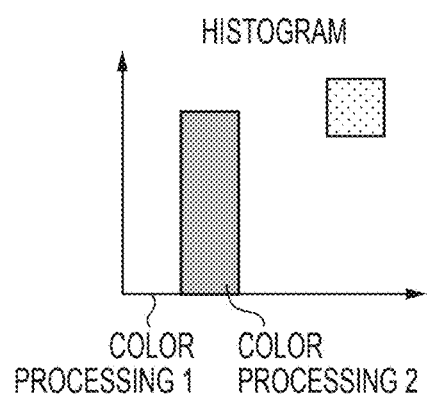

In the color processing result 1006 shown in FIG. 10B, a pixel 1007 indicates a pixel for which color processing 1 is decided. A pixel 1008 indicates a pixel for which color processing 2 is decided. As shown in FIG. 10C, in the edge region, color processing 1 is decided for all the pixels. As shown in FIG. 10F, in the non-edge region, color processing 2 is decided for all the pixels. As shown in FIG. 10E, in the intermediate region of a distance of 1 from the edge, the ratio of the pixels for which color processing 1 is decided is high. As shown in FIG. 10D, in the intermediate region of a distance of 2 from the edge, the ratio of the pixels for which color processing 2 is decided is high. Note that in the intermediate region, a certain amount of pixels for which color processing 1 is decided and a certain amount of pixels for which color processing 2 is decided are included. Note that a white region of the region setting information 1001 shown in FIG. 10A is a region where a pixel value is "0", and a region where ink information of an ink amount "0" is generated regardless of which of color processing 1 and color processing 2 is decided and executed.

As described above, in this embodiment, for each pixel, color processing is decided so that color processing 1 or color processing 2 is executed. That is, according to this embodiment, in a pixel for which color processing 1 is decided, no ink of each of cyan, magenta, and yellow is generated, and in a pixel for which color processing 2 is decided, no black ink is generated.

An effect obtained by this embodiment will be described below. Assume a case in which color processing 1 and color processing 2 are executed in the same pixel. For example, if color processing 1 and color processing 2 are executed by calculating a weighted average or the like in the same pixel, ink droplets discharged by the different color processes overlap each other in the same pixel. If, for example, ink generated by color processing 1 and ink generated by color processing 2 have different permeabilities, a phenomenon that ink having low permeability is influenced by ink having high permeability to be submerged in the print medium occurs, thereby causing deterioration of image quality.

Figure 18:
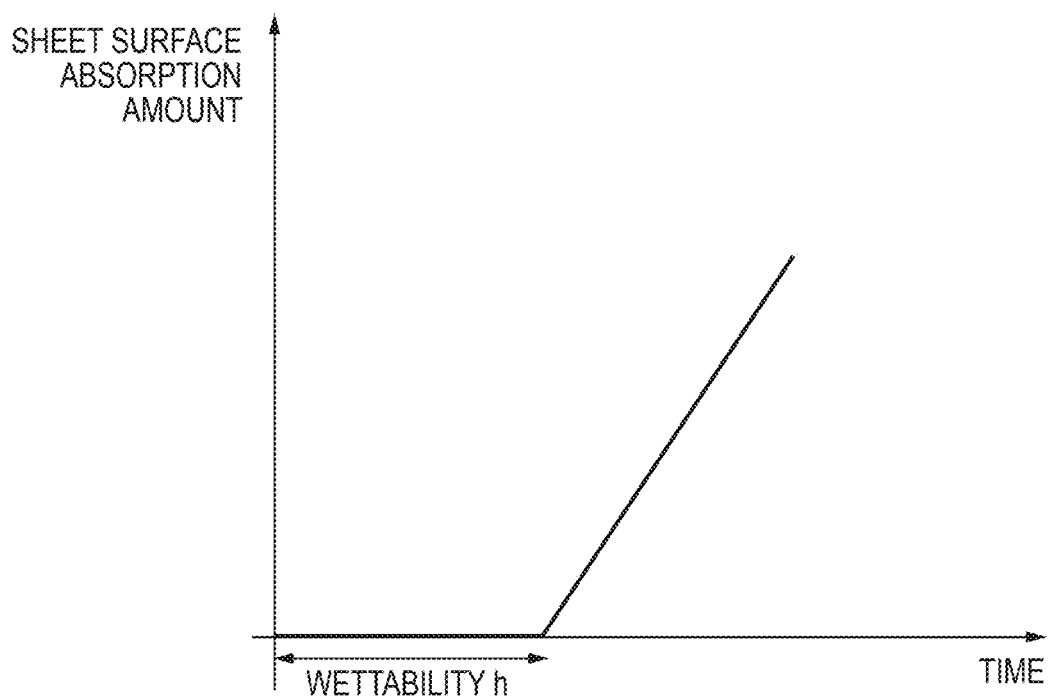
FIG. 18 is a timing chart for explaining an absorption coefficient.

The submerged phenomenon of ink will be described. FIGS. 11A to 11D are views for explaining the submerged phenomenon of ink. In FIGS. 11A to 11D, ink 1101 represents black ink generated by color processing 1, and ink 1102 represents ink of one of cyan, magenta, and yellow generated by color processing 2. The black ink represented by the ink 1101 is pigment ink that represents the density by remaining on the surface of the print medium. Furthermore, ink of each of cyan, magenta, and yellow represented by the ink 1102 is dye ink that represents the density by permeating in a gap in the print medium and fixing to the fiber of the sheet. The pigment ink represented by the ink 1101 has permeability lower than that of the dye ink represented by the ink 1102. Each rectangle in FIGS. 11A to 11D indicates a pixel width. Note that the dot diameter of an ink droplet is smaller than the pixel width in this example but may be larger than the pixel width. Note that high or low permeability of ink is represented by, for example, an "absorption coefficient". The absorption coefficient indicates the relationship between an absorption amount and an elapsed time until ink is absorbed in the print medium and fixed, and is represented by the inclination of a graph shown in FIG. 18. The absorption coefficient is measured by, for example, the Bristow (dynamic permeability) method. FIG. 18 shows a state in which an ink droplet is not absorbed in the print medium immediately after the ink droplet is discharged onto the print medium, and starts to be absorbed at a given point of time with the lapse of time. A surfactant is often used for ink to promote fixing to the sheet surface in a solid region of the image and the like. The surfactant has an effect of shortening the time of wettability h in FIG. 18, and an effect of increasing the absorption coefficient after the start of absorption (increasing the inclination of the graph). Due to the surfactant, the ink tends to permeate more deeply in the depth direction of the print medium. As the ink permeates more deeply, the amount of light reflected before reaching the ink increases with respect to incident light, and thus the density tends to decrease.

Figure 11A:
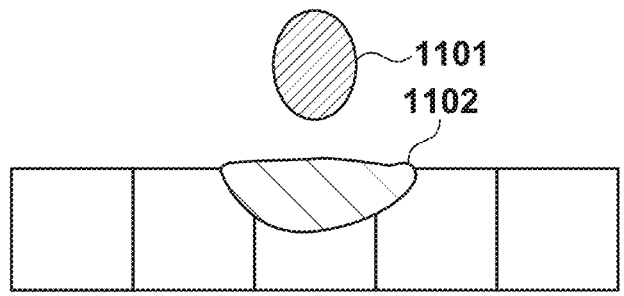
FIGS. 11A to 11D are views for explaining the submerged phenomenon of ink.
Figure 11B:
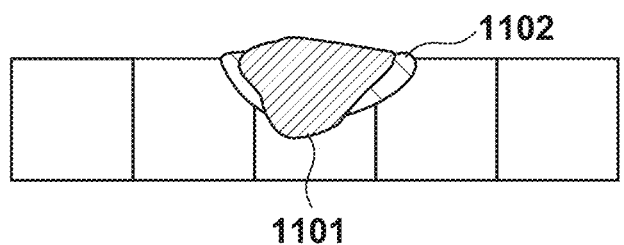

FIGS. 11A and 11B show a case in which ink droplets overlap each other in the same pixel. As shown in FIG. 11A, the dye ink having high permeability represented by the ink 1102 has already landed on the print medium and permeated. The pigment ink having low permeability represented by the ink 1101 is about to land on the same pixel as that of the pigment ink on the print medium. FIG. 11B shows a state at a time after the state shown in FIG. 11A. As shown in FIG. 11B, the pigment ink having low permeability represented by the ink 1101 also lands on the print medium. The pigment ink represented by the ink 1101 is influenced by the surfactant of the dye ink having higher permeability and a large amount of pigment ink is submerged in the depth direction. This submerged phenomenon changes the density, thereby causing degradation of the image quality.

Figure 11C:
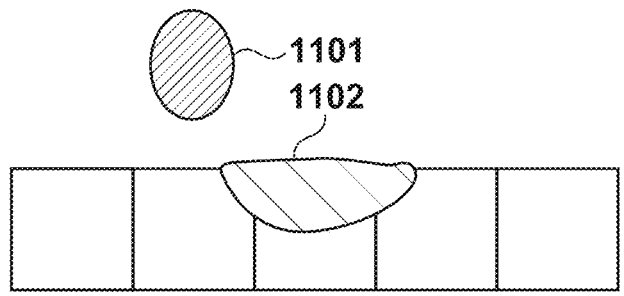
Figure 11D:
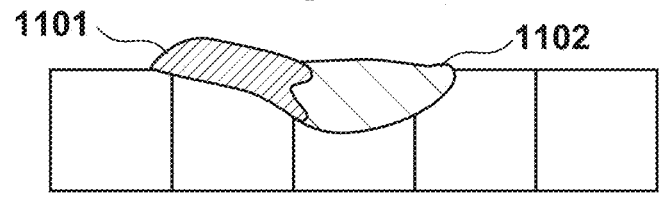

On the other hand, FIGS. 11C and 11D show a case in which ink droplets overlap each other not in the same pixel but in a portion of an adjacent pixel protruding from the dot diameter. As shown in FIG. 11C, the dye ink having high permeability represented by the ink 1102 has landed on the print medium and permeated, and the pigment ink having low permeability represented by the ink 1101 is about to land on the pixel different from that of the dye ink on the print medium. FIG. 11D shows a state at a time after the state shown in FIG. 11C. As shown in FIG. 11D, the pigment ink having low permeability represented by the ink 1101 also lands on the print medium. In the region where the pigment ink and the dye ink overlap each other, the pigment ink represented by the ink 1101 is submerged in the dye ink having higher permeability but the ratio of the submerged amount with respect to the landed amount is lower than that in the state shown in FIG. 11B.

In this embodiment, it is possible to suppress overlapping of ink droplets discharged by the different color processes in the same pixel, and thus prevent degradation of the image quality caused by the above-described submerged phenomenon.

In the example shown in FIGS. 11A to 11D, the dye ink and the pigment ink land on the sheet surface in this order. However, even if the landing order is reversed, the submerged phenomenon can occur. If, during a period until at least an ink droplet, which has landed first, completely permeates and is fixed, a subsequent droplet lands, the submerged phenomenon can occur. Therefore, even with an arrangement in which the printheads 103 and the carriage 201 execute, for each scanning region of the sheet, bidirectional printing to discharge ink droplets while scanning from the left end to the right end at a given position and scanning from the right end to the left end at a given position, it is possible to obtain the same effect. Furthermore, even with an arrangement of multi-pass printing in which after discharging ink droplets while scanning from the left end to the right end at a given position, ink droplets are discharged while scanning from the right end to the left end at the same position, it is possible to obtain the same effect. Even with an arrangement of not the serial printheads 103 shown in FIG. 2 but line printheads in which nozzles are arranged over the sheet width, it is possible to obtain the same effect as long as the landing order on the print medium is different between the ink droplets. If the nozzle length corresponding to a given ink color is longer than others, after an ink droplet corresponding to the long nozzle length lands on the print medium, an ink droplet corresponding to a short nozzle length may land on the same position. In this case as well, if the landing order on the print medium is different between the ink droplets, it is possible to obtain the same effect.

As described above, according to this embodiment, with reference to different mask information in accordance with the distance from the edge, color processing is decided by the mask value corresponding to the position of the target pixel. That is, the different color processes are not executed in the same pixel, and it is possible to prevent ink droplets discharged by the different color processes from overlapping each other in the same pixel, thereby preventing degradation of the image quality, as described above. If a dot diameter formed on the print medium is larger than the pixel, ink droplets discharged by the different color processes may overlap each other over pixels. However, in this case as well, as compared with the case in which the different color processes are executed in the same pixels, the overlapping amount is small, thereby making it possible to suppress degradation of the image quality.

In this embodiment, a color change in the intermediate region is represented using the probability mask. For example, as will be described below, it is possible to design the probability mask by modulating the probability (to also be referred to as execution probability hereinafter) of deciding execution of each color process. For example, to represent an intermediate color satisfying linearity, in the intermediate region of a distance of 1 from the edge, the probability mask is designed so that the probability of deciding color processing 1 is 66% and the probability of deciding color processing 2 is 34%. In the intermediate region of a distance of 2 from the edge, the probability mask is designed so that the probability of deciding color processing 1 is 34% and the probability of deciding color processing 2 is 66%. Note that if three intermediate regions are provided, for example, three kinds of probability masks are designed so that the probabilities of deciding color processing 1 are 75%, 50%, and 25%, respectively, from the intermediate region closest to the edge. On the other hand, the three kinds of probability masks are designed so that the probabilities of deciding color processing 2 are 25%, 50%, and 75%, respectively.

For example, in the arrangement of implementing a color change in the intermediate region by executing a plurality of color processes for the same pixel, it is necessary to calculate the weighted average ratio of each color process in accordance with a gradation value. In this embodiment, it is possible to implement a color change in the intermediate region with a simpler arrangement, as compared with such arrangement.

Note that in design of the probability mask, in the edge region, the probability of deciding color processing 1 need not be 100%, and the probability of deciding color processing 1 may be modulated, similar to the intermediate region. Similarly, in the non-edge region, the probability of deciding color processing 2 need not be 100%, and the probability of deciding color processing 2 may be modulated, similar to the intermediate region. The mask size of the probability mask 801 is set based on the number of pixels for sufficiently implementing the probability of deciding each color process, as described above.

After step S106 of FIG. 3, in step S107, the main control unit 108 executes quantization processing for each type of ink based on the ink information generated in each pixel. The result of the quantization processing of ink of each of cyan, magenta, yellow, and black is passed to a print process via the I/Fs 109 and 105. Note that processing other than the processes shown in FIG. 3 may be performed. For example, between steps S106 and S107, gradation value conversion processing using a one-dimensional LUT may be executed in consideration of sheet tonality of each piece of ink information. Furthermore, unevenness correction using a one-dimensional LUT may be executed in consideration of discharge unevenness caused by nozzle tolerance in the print process. The result of the quantization processing is stored in the data buffer 106, and then transmitted to the print buffer 102 in synchronism with the operation of the printheads 103 and the carriage 201. For example, a data amount for one scan of the printheads 103 and the carriage 201 is transmitted to the print buffer 102.

The printheads 103 and the carriage 201 discharge ink droplets in the Z direction while performing one-way scanning from left to right in the X direction in FIG. 2 by setting the left end of the belt 205 as a print start position and the right end of the belt 205 as a print end position. Then, after the end of scanning up to the end of the sheet, the printheads 103 and the carriage 201 scan from right to left without discharging, and return to the original position. After that, the sheet moves in the Y direction by an amount corresponding to one scan, and then, the printheads 103 discharges ink again while scanning from the left end to the right end. Then, along with the movement of the sheet in the Y direction, the result of the quantization processing of each ink is transmitted to the print buffer 102 for next one scan. Note that the above operation of the printheads 103 and the carriage 201 is merely an example, and operations corresponding to various print control operations such as multi-pass printing are performed.

Figures 12, 13:
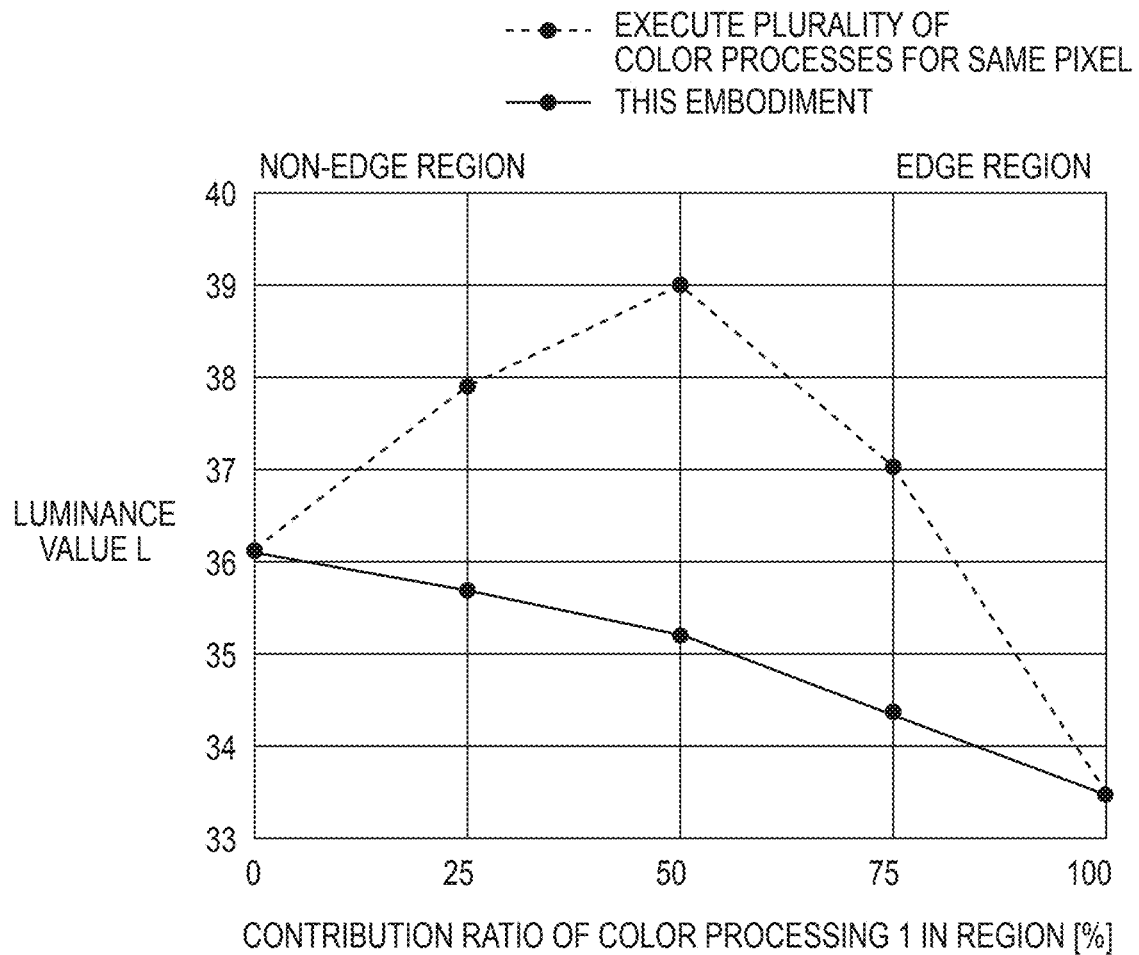
FIG. 12 is a graph for explaining the effect of suppression of a color change in an intermediate region.
FIG. 13 is a table showing pixel additional information held in each pixel.

FIG. 12 is a graph for explaining the effect of suppression of a color change in the intermediate region according to this embodiment. Note that in this example, in the edge region, color processing 1 of generating black ink is executed for all the pixels. In the non-edge region, color processing 2 of generating ink of each of cyan, magenta, and yellow is executed for all the pixels. In FIG. 12, the ordinate represents a luminance value L. In FIG. 12, the abscissa represents the contribution ratio of color processing 1 in the region, and the value is larger as the position is closer to the edge region. For example, a numerical value "75" on the abscissa indicates that the execution probability of color processing 1 is 75%.

A solid line in FIG. 12 indicates a color change in the intermediate region using the probability mask according to this embodiment. On the other hand, a dotted line in FIG. 12 indicates a color change in the intermediate region by processing of making different color processes overlap each other in the same pixel. In the method indicated by the dotted line, for example, in the same pixel, color processing 1 and color processing 2 are made to overlap each other at a ratio of 75%:25% by calculating a weighted average or the like. To the contrary, in the method of this embodiment indicated by the solid line, the probability mask in which the pixels for which color processing 1 is decided to be executed and the pixels for which color processing 2 is decided to be executed are dispersed and arranged at a ratio of 75:25 is used. As indicated by the dotted line in FIG. 12, in the intermediate region, a region having a luminance value higher than those of the edge region and the non-edge region is generated, and no smooth luminance change is obtained. On the other hand, by the method of this embodiment, a smooth luminance change is implemented, as indicated by the solid line.

This is because, in the method indicated by the dotted line in FIG. 12, ink droplets land, as shown in FIGS. 11A and 11B. That is, after ink of each of cyan, magenta, and yellow lands, before it is fixed completely, black ink lands on the same pixel. Therefore, black ink is influenced by the surfactant contained in ink of each of cyan, magenta, and yellow to be submerged in the print medium, thereby decreasing the density.

On the other hand, in the method of this embodiment indicated by the solid line in FIG. 12, ink droplets land, as shown in FIGS. 11C and 11D. That is, after ink of each of cyan, magenta, and yellow lands, before it is fixed completely, black ink lands on a different pixel. If the dot diameter is larger than the pixel width, black ink may be influenced by the surfactant contained in ink of each of cyan, magenta, and yellow in the boundary portion between the pixels, and may permeate the sheet. However, the ratio of the submerged amount with respect to the landed amount is lower than that in the method indicated by the dotted line in FIG. 12, thereby making it possible to reduce the decrease in density.

Note that this embodiment has explained the case in which only black ink is generated in all the gradations in color processing 1 and only ink of each of cyan, magenta, and yellow is generated in color processing 2, as shown in FIGS. 19A and 19B, but the present invention is not limited to this. For example, in color processing 2, ink of each of cyan, magenta, yellow, and black may be generated. In this arrangement, a pixel for which color processing 2 is executed is applied with black ink in the non-edge region, and thus black ink overlaps ink of each of cyan, magenta, and yellow. However, the application amount of black ink can be predicted when designing the color processing for the non-edge region. Therefore, it is possible to design, in advance, the color processing for the non-edge region so that all the gradations are connected smoothly by compensating for the corresponding decrease of the density. As compared with color processing 1 to be used for the edge region, in color processing 2 used for the non-edge region, an amount of chromatic color ink may be relatively larger than that of achromatic color ink. To represent the sharpness of the edge, gray ink of achromatic color having a color material density lower than that of black ink may be used as an ink type used for the edge region, instead of black ink.

Furthermore, if gray ink is used, it may be used in the same manner as that of black ink or color ink of cyan, magenta, or yellow in accordance with the property of gray ink. Alternatively, in addition to cyan, magenta, and yellow inks, light shade ink having a low color material density or spot color ink may be used in the same manner as that of chromatic color ink.

In this embodiment, one of color processing 1 and color processing 2 is executed in each pixel in the intermediate region. However, a form of selectively executing one of three or more processes may be adopted. For example, color processing 3 of outputting an output value between the output value of color processing 1 and that of color processing 2 is prepared and one of color processes 1, 2, and 3 is selectively executed for each pixel in the intermediate region. Color processing 3 is processing of outputting, for an input value, an output value between the output value of color processing 1 and that of color processing 2.

This embodiment has explained color processing 2 as "color processing of generating ink of each of cyan, magenta, and yellow to improve the granularity and tonality with respect to gray information". However, black ink may be generated in color processing 2. That is, in the ink generation table of color processing 2, an output value may be defined to generate ink of each of cyan, magenta, yellow, and black.

As described above, according to this embodiment, it is possible to suppress an abrupt color change in the intermediate region, and also suppress degradation of image quality caused by execution of different color processes in the same pixel.

Second Embodiment

The second embodiment will be described below with respect to the difference from the first embodiment. Assume, for example, a case in which the user selects an art letter and uses it in an edit screen in an office application. In this case, the art letter can be determined as character information or graphic information by the application. That is, even though the user who operates the application recognizes the art letter as character information, the art letter may be determined as graphic information. In this case, color processing different from recognition of the user is unwantedly executed. In this embodiment, object information acquired from object image data is preferentially used as a determination criterion of color processing over edge information acquired from bitmap image data. That is, if a character object is determined, color processing 1 is decided as color processing to be executed without determining a distance from the edge of a target pixel. This arrangement can prevent execution of color processing different from recognition of the user.

Steps S101 to S104 of FIG. 3 are the same as those in the first embodiment. Note that in this embodiment, object information held in each pixel of object image data generated in step S102 includes information representing whether a character object is indicated.

FIG. 13 is a table showing an example of pixel additional information obtained from steps S102, S103, and S104 and held in each pixel. Each of pixels S to Z in FIG. 13 holds, as pixel additional information, object information representing whether object information is indicated, edge information representing whether a non-edge region is indicated, and distance information from the edge.

As indicated by a mark "○" on the first row in FIG. 13, the object information corresponding to each of the pixels S, T, U, and Y indicates a character object. As indicated by a mark "×" on the first row in FIG. 13, the object information corresponding to each of the pixels V, W, X, and Z indicates not a character object (a non-character object).

As indicated by a mark "○" on the second row in FIG. 13, the edge information corresponding to each of the pixels S, T, U, V, W, and X indicates not a non-edge region. Note that "not a non-edge region" indicates one of an edge region, an intermediate region of a distance of "1" from the edge, and an intermediate region of a distance of "2" from the edge. As indicated by a mark "×" on the second row in FIG. 13, the pixels Y and Z are pixels belonging to the non-edge region.

The distance information from the edge corresponding to each of the pixels S and V on the third row in FIG. 13 indicates an edge region of a distance of "0" from the edge. The distance information from the edge corresponding to each of the pixels T and W on the third row in FIG. 13 indicates an intermediate region of a distance of "1" from the edge. The distance information from the edge corresponding to each of the pixels U and X on the third row in FIG. 13 indicates an intermediate region of a distance of "2" from the edge.

Since the object information is acquired from the object image data and the edge information is acquired from the bitmap data, there exist eight combinations of the pieces of object information and the pieces of edge information, as shown in FIG. 13. In step S105 of FIG. 3, a main control unit 108 determines color processing to be executed for each pixel.

Figure 14:
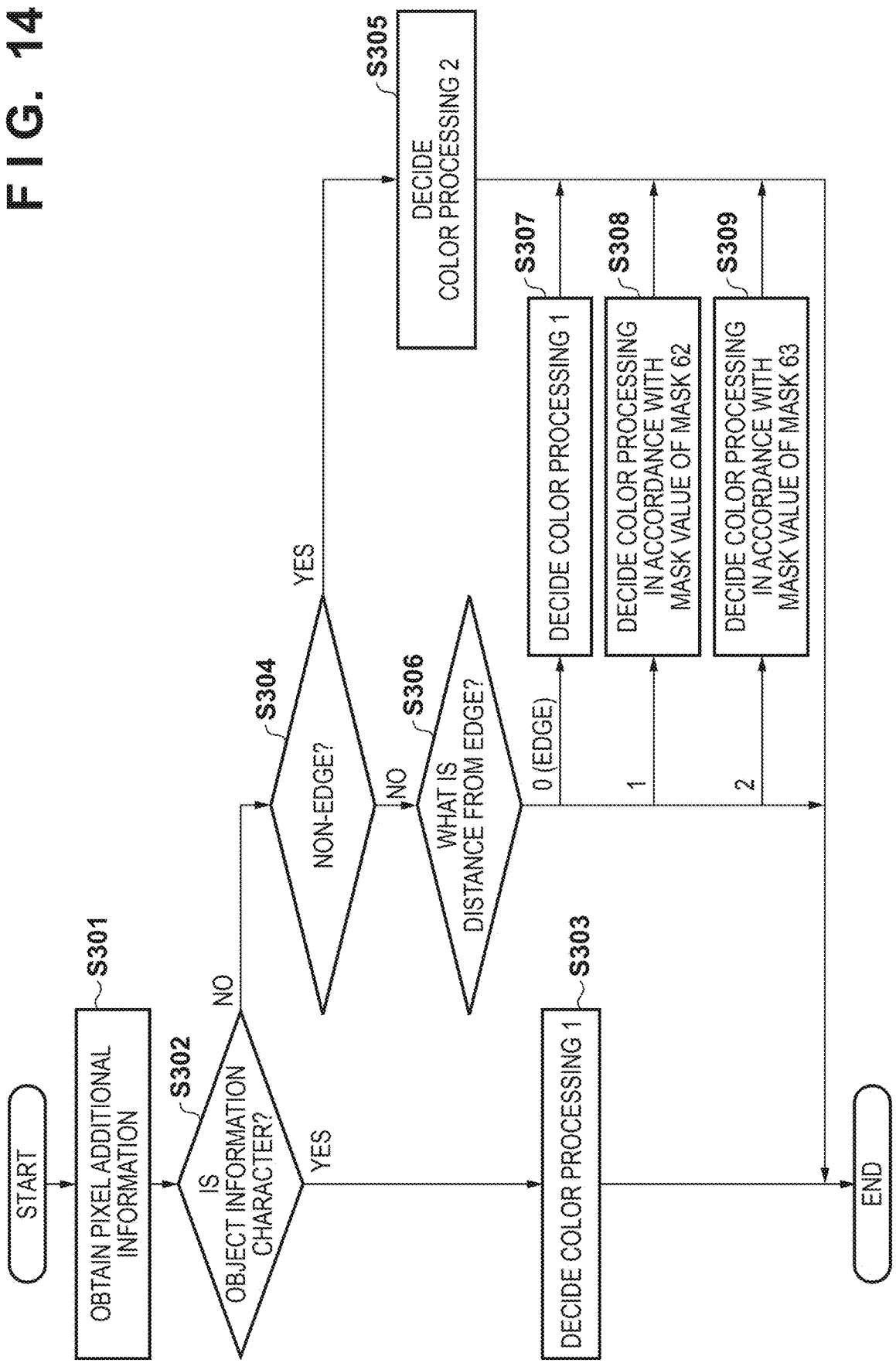
FIG. 14 is a flowchart illustrating color processing determination processing.

FIG. 14 is a flowchart illustrating the color processing determination processing in step S105 according to this embodiment. The processing shown in FIG. 14 is repeatedly performed for each pixel of the image represented by the bitmap data. Processing for a target pixel of interest will be described below.

In step S301, the main control unit 108 acquires the pixel additional information shown in FIG. 13. In step S302, the main control unit 108 determines, based on the pixel additional information acquired in step S301, whether the object information corresponding to the target pixel indicates a character object. If it is determined that the object information indicates a character object, the process advances to step S303.

In step S303, the main control unit 108 decides color processing 1 as color processing to be executed for the target pixel. Similar to the first embodiment, color processing 1 is, for example, processing of generating black ink to make the edge sharp with respect to gray information. After step S303, the processing shown in FIG. 14 ends. On the other hand, if it is determined in step S302 that the object information does not indicate a character object, the process advances to step S304. Steps S304 to S309 are the same as steps S202 to S207 of FIG. 9.

As described above, in this embodiment, if it is determined in step S302 that the object information indicates a character object, color processing 1 is decided as color processing to be executed without determining the distance of the target pixel from the edge. That is, in this embodiment, the object information representing whether a character object is indicated is preferentially used as a determination criterion of the color processing over the edge information. For example, if it is determined that the object information corresponding to the target pixel indicates a character object, color processing 1 is decided without determining whether a non-edge region is indicated or determining the distance from the edge. With this arrangement, if, with respect to an object such as an art letter that can be determined as character information or graphic information, it is determined in step S302 that the object information indicates a character object, color processing suitable for the character object is executed. As a result, it is possible to prevent execution of color processing different from recognition of the user.

This embodiment has explained that color processing 1 is decided in step S303. However, when the object information indicates a character object, if predetermined color processing is decided without performing the processes in step S304 and the subsequent steps, color processing 1 need not be decided. For example, color processing 2 may be decided in step S303. The above predetermined color processing may be settable on a user interface screen displayed on a display unit 110. For example, the type of each object of a character/graphics/image and execution/non-execution of gray compensation are displayed on a possible setting screen, and setting contents on the screen may be reflected on the processing shown in FIG. 14.

As the object information and the edge information shown in FIG. 13, other information may be used. For example, as the object information and the edge information shown in FIG. 13, scores may be used. For example, if the object information indicates a character object, "0.7" is given. If the object information indicates a graphic object, "0.5" is given. If the object information indicates an image object, "0.3" is given. That is, by making the score for the character object highest, color processing 1 can be decided more preferentially for the character object. Then, if the edge information indicates not a non-edge region, "0.5" is given. If the edge information indicates a non-edge region, "0.0" is given. After step S301, the sum of the scores of the object information and the edge information is determined for each target pixel, instead of steps S302 and S304.

In the above example, six scores of "1.2", "1.0", "0.8", "0.7", "0.5", and "0.3" can be calculated. That is, "1.2" is a score for "character object" and "edge region/intermediate region". "1.0" is a score for "graphic object" and "edge region/intermediate region". "0.8" is a score for "image object" and "edge region/intermediate region". "0.7" is a score for "character object" and "non-edge region". "0.5" is a score for "graphic object" and "non-edge region". "0.3" is a score for "image object" and "non-edge region".

As determination of the sum of the scores, for example, if the sum is equal to or larger than a threshold "1.2", the processing in step S303 is executed. If the sum is equal to or larger than a threshold "0.8" and is smaller than "1.2", the processes in step S306 and the subsequent steps are executed. Alternatively, if the sum is smaller than "0.8", the processing in step S305 is executed. As described above, color processing to be executed may be decided by giving the scores. In this arrangement, a threshold to be compared with the sum of the scores may be changed. For example, assume that if the sum is equal to or larger than "1.0", the processing in step S303 is executed. In this case, if the object information indicates the character object information or graphic information, the predetermined color processing is decided in step S303 without determining whether a non-edge region is indicated or determining the distance from the edge. That is, an arrangement for determining the type of object for which the predetermined color processing is decided without determining whether a non-edge region is indicated or determining the distance from the edge can be implemented flexibly.

Third Embodiment

The third embodiment will be described below with respect to the difference from the first and second embodiments. In the first and second embodiments, in the intermediate region between the edge region and the non-edge region, which of color processing 1 and color processing 2 is to be executed is decided for each pixel using the probability mask. This decision processing is performed so that the probability of deciding color processing 1 is higher for the intermediate region closer to the edge region among the intermediate regions and the probability of deciding color processing 2 is higher for the intermediate region closer to the non-edge region among the intermediate regions. That is, up to step S106 of FIG. 3, it is possible to decide color processing 1 or color processing 2 for each region at an expected probability in accordance with the distance from an edge.

In quantization processing in step S107 of FIG. 3, the signal value of each ink is compared with a threshold corresponding to a pixel position using threshold mask information corresponding to each piece of ink information. If the ink signal value exceeds the threshold, a print dot is generated; otherwise, no print dot is generated. That is, as the ink signal value is larger, and the threshold is smaller, a print dot is generated more easily. The threshold is a parameter depending on the design of a threshold mask.

For example, assume a given density region uniform in a plane. If the in-plane density undergoes color processing by color processing 1, a signal value X is output for ink A. If the in-plane density undergoes color processing by color processing 2, the signal value X is output for ink B. That is, if the color processing is switched, different ink is generated but the output signal value is the same. Then, assume that a probability mask is formed so that the execution probability of color processing 1 is 50% and the execution probability of color processing 2 is 50%. In this case, up to step S106 of FIG. 3, color processing 1 is executed for about 50% of the pixels in the region and color processing 2 is executed for about 50% of the pixels in the region. Therefore, ink A is generated for about 50% of the pixels in the region and ink B is generated for the remaining about 50% of the pixels. If among the thresholds of a quantization threshold mask corresponding to the pixels in the region for which color processing 1 is executed, an extremely large number of thresholds are high, and the final generation ratio between the print dots of ink A and those of ink B may not be 50:50, and may change to 30:70 or 20:80.

To cope with this, in this embodiment, a probability mask used in step S105 of FIG. 3 is formed in consideration of the quantization threshold mask used in the quantization processing in step S107. In this embodiment, this arrangement can prevent the generation ratio of the print dots from changing due to the quantization threshold mask.

Figures 15A, 15B:
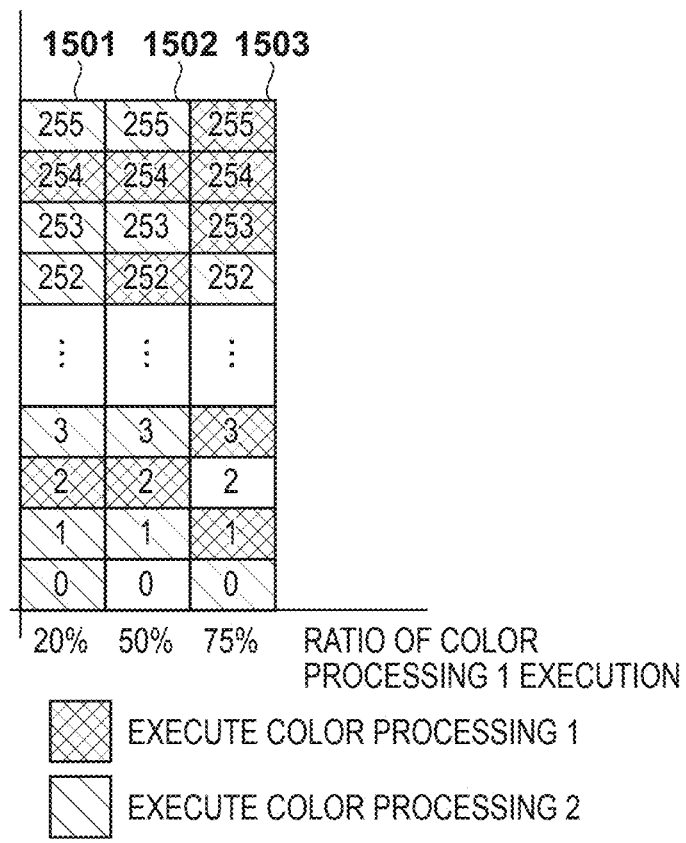
FIGS. 15A and 15B are views for explaining a probability mask.
Figure 16:
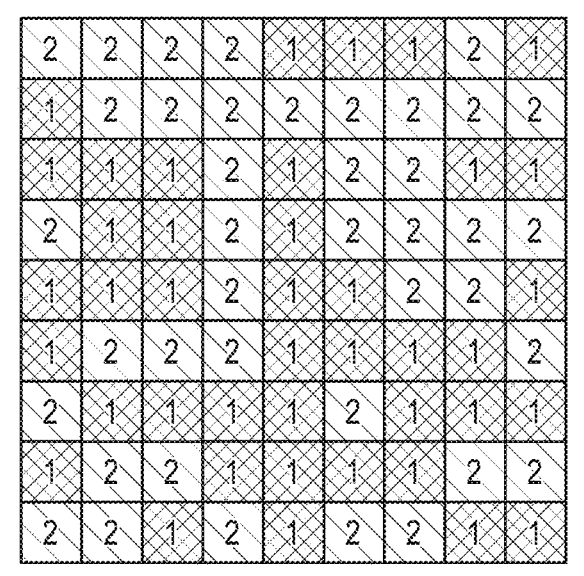

FIGS. 15A, 15B, and 16 are views for explaining the probability mask according to this embodiment. FIG. 15A shows an example of the quantization threshold mask used in step S107 of FIG. 3. As each threshold set in the quantization threshold mask is smaller, a print dot is more easily generated. As each threshold is larger, a print dot is more difficultly generated.

FIG. 15B shows an example of a method of forming a probability mask corresponding to the quantization threshold mask. For example, if the generation percentage of the print dots of ink generated by color processing 1 is controlled to each of 25%, 50%, and 75%, the distribution of the pixels in the probability mask, for which color processing 1 is executed, is set to be a distribution 1501, 1502, or 1503 shown in FIG. 15B.

For example, as indicated by the distribution 1501 in FIG. 15B, the pixels for which color processing 1 is decided are distributed to correspond to pixel positions assigned with thresholds of 2, 6, 10, . . . , 250, and 254 of the quantization threshold mask. On the other hand, the pixels for which color processing 2 is decided are distributed to correspond to pixel positions assigned with thresholds of 0, 1, 3, . . . , 252, 253, and 255 of the quantization threshold mask. Assume that the pixels for which color processing 1 is decided are dispersed concentratedly to correspond to pixel positions assigned with large thresholds such as the thresholds of 252, 235, 254, and 255 of the quantization threshold mask. In this case, when no print dot is generated, it may become impossible to achieve the execution probability of color processing 1 defined by the probability mask. However, in this embodiment, as described above, the corresponding color processing is dispersed almost uniformly over the entire region of the thresholds, and thus it is possible to almost maintain the execution probability of the color processing defined by the probability mask.

The same applies to the distributions 1502 and 1503 shown in FIG. 15B. FIG. 16 is a view showing an example of the probability mask formed so that the ratio between the print dots generated by color processing 1 and those generated by color processing 2 is 50:50 in consideration of the quantization threshold mask shown in FIG. 15A.

As described above, according to this embodiment, it is possible to suppress variations of the execution probability of the color processing defined by the probability mask, which can be generated by the quantization threshold mask.

Fourth Embodiment

The fourth embodiment will be described below with respect to the difference from the first to third embodiments. Each of the first to third embodiments has explained the case in which the color processing to be executed for each pixel in the intermediate region between the edge region and the non-edge region is decided based on the execution probability defined by the probability mask. In this embodiment, color processing to be executed for each pixel in an intermediate region is decided without using a probability mask.

In this embodiment, color processing to be executed for each pixel in an intermediate region between an edge region and a non-edge region is decided based on an occurrence probability implemented by a pseudo random number. In this embodiment, after step S104 of FIG. 3, in step S105, a main control unit 108 generates a random number including a decimal fraction from 0 to 1. Based on conditional branching with respect to the numerical value of the generation result, color processing is determined. For example, assume that with respect to the color processing to be executed for each pixel in the intermediate region, color processing 1 is decided at a probability of 50% and color processing 2 is decided at a probability of 50%. In this case, if the generated random number is larger than 0.5, the main control unit 108 decides color processing 1; otherwise, the main control unit 108 decides color processing 2. Alternatively, assume that color processing 1 is decided at a probability of 20% and color processing 2 is decided at a probability of 80%. In this case, if the generated random number is larger than 0.8, the main control unit 108 decides color processing 1; otherwise, the main control unit 108 decides color processing 2.

In this embodiment, the method of generating a random number is not limited to the above example, and it is unnecessary to generate a random number including a decimal fraction from 0 to 1. The threshold of the random number for deciding color processing may be decided based on an image characteristic, and may be decided based on, for example, required noise shaping (colors of noise such as white noise or blue noise). The generation of the pseudo random number may be combined with another arrangement. For example, a predetermined color processing execution pattern may be held, and execution/non-execution of color processing 1 or 2 may be decided periodically in the pattern based on the pseudo random number.

Figure 17:
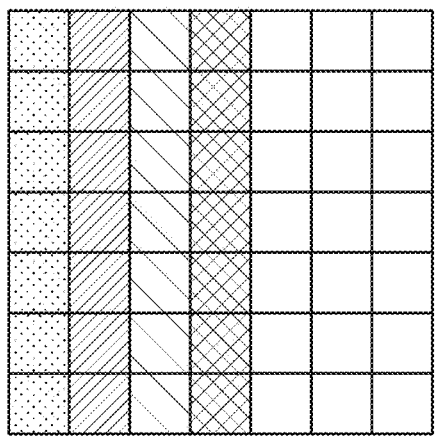
FIGS. 17A to 17D are views for explaining an arrangement in which no probability mask is used.

Another arrangement that uses no probability mask will be described below. For example, color processing may be decided based on a binary decision probability implemented by a Floyd-Steinberg pattern, shown in FIG. 17A, as one of error diffusion models without using a probability mask. FIG. 17B shows the initial value of the comparison value of each pixel to be compared with a threshold X. In this example, the comparison value and the threshold X are parameters for deciding color processing 1 or color processing 2, and the initial value of the comparison value is uniformly set to 128 regardless of the region. Note that the upper left corner of each pixel in FIG. 17B is added with a symbol f, f1, f2, f3, or f4 as the number of the comparison value corresponding to each pixel for the sake of descriptive convenience. The pixel f corresponds to BASE in the error diffusion model, and there is no error propagation. Selection of color processing of the pixel f is made based on:

result of selection of color processing of pixel
$f$=color processing 1(128>$X$) or color processing 2(128<$X$)  (2)

That is, decision of color processing 1 or color processing 2 is associated with binary decision in the error diffusion model. The threshold X is a parameter for modulating the probability of the color processing to be executed in the region. As the threshold X is larger, the probability of deciding color processing 2 as the color processing to be executed is higher. As the threshold X is smaller, the probability of deciding color processing 1 as the color processing to be executed is higher.

If the result of selection of the color processing of the pixel f is color processing 1, the comparison values of the pixels f1, f2, f3, and f4 to be compared with the threshold X change from the initial value of 128 based on the binary decision principle in the error diffusion model, as given by equations (3) to (6) below.

$f1'=128+(255-128)\times 7/16$  (3)

$f2'=128+(255-128)\times 3/16$  (4)

$f3'=128+(255-128)\times 5/16$  (5)

$f4'=128+(255-128)\times 1/16$  (6)

If the result of selection of the color processing of the pixel f is color processing 2, the comparison values of the pixels f1, f2, f3, and f4 to be compared with the threshold X change from the initial value of 128 based on the binary decision principle in the error diffusion model, as given by equations (7) to (10) below.

$f1'=128+(128-0)\times 7/16$  (7)

$f2'=128+(128-0)\times 3/16$  (8)

$f3'=128+(128-0)\times 5/16$  (9)

$f4'=128+(128-0)\times 1/16$  (10)

That is, if the result of selection of the color processing of the pixel f is color processing 1, "255—comparison value" is set as an error amount in the error diffusion model, and is distributed to the peripheral pixels. On the other hand, if the result of selection of the color processing of the pixel f is color processing 2, "comparison value—0" is set as an error amount in the error diffusion model, and is distributed to the peripheral pixels. As a result, for a region where the threshold X is larger, the probability of deciding color processing 2 is higher, and for a region where the threshold X is smaller, the probability of deciding color processing 1 is higher. That is, using the fact that the execution probability of each color process can be modulated by adjusting the threshold X for each region, the threshold is made smaller for a region closer to the edge region, and is made larger for a region closer to the non-edge region. Then, in each region, pixels corresponding to each color process are dispersed based on the dot dispersion principle in the error diffusion model.

Alternatively, the execution probability of each color process may be modulated by adjusting the comparison value for each region, instead of adjusting the threshold X. That is, the fact that the probability of deciding color processing 1 is higher for a region where the comparison value is large, and the probability of deciding color processing 2 is higher for a region where the comparison value is smaller may be used. That is, for a region closer to the edge region, the comparison value of the region is made larger, and for a region closer to the non-edge region, the comparison value of the region is made smaller. Then, in each region, pixels corresponding to each color process are dispersed based on the dot dispersion principle in the error diffusion model. FIG. 17C shows the same information as the region setting information 701 of FIG. 7B. FIG. 17D shows examples of comparison values corresponding to the respective regions shown in FIG. 17C.

As described above, according to this embodiment, color processing to be executed for each pixel in the intermediate region between the edge region and the non-edge region can be decided probabilistically without using a probability mask. According to this embodiment, in addition to the effects obtained in the first to third embodiments, it is possible to save the memory since no probability mask needs to be held.

Note that each of the above-described embodiments has exemplified the image processing for the inkjet printing apparatus using ink as a printing material. The present invention, however, is not limited to this. For example, the operation of each embodiment is also applicable to, for example, an electrophotographic printing apparatus for printing an image using toner as a printing material, and it is possible to obtain the same effects.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-079888, filed May 10, 2021, which is hereby incorporated by reference herein in its entirety.

What is claimed is:

1. An image processing apparatus comprising:
at least one memory and at least one processor causing a computer to:
execute rendering processing so as to acquire multi-gradation image data;
set, in the acquired multi-gradation image data, a first region, a second region that does not contact the first region, and an intermediate region located between the first region and the second region; and
selectively execute, for each pixel in each of the first region, the second region, and the intermediate region, one of a plurality of processes, wherein the plurality of processes include first processing of generating an output value indicating that a first printing material is applied and a second printing material of a color different from a color of the first printing material is not applied, and second processing of generating an output value indicating that the second printing material is applied, wherein the first processing or the second processing is selectively executed for each pixel,
wherein a ratio of pixels, for which the first processing is executed, included in the first region is higher than a ratio of pixels, for which the first processing is executed, included in the second region, and is higher than a ratio of pixels, for which the first processing is executed, included in the intermediate region,
a ratio of pixels, for which the second processing is executed, included in the second region is higher than a ratio of pixels, for which the second processing is executed, included in the first region, and is higher than a ratio of pixels, for which the second processing is executed, included in the intermediate region, and
a ratio of pixels for which the first processing is executed at a first position is higher than a ratio of pixels for which the first processing is executed at a second position farther away from the first region than the first position in the intermediate region, and a ratio of pixels for which the second processing is executed at the second position is higher than a ratio of pixels for which the second processing is executed at the first position in the intermediate region,
wherein the at least one processor is configured to cause the computer to use a random number to decide one of the plurality of processes as the processing to be executed for each pixel in the intermediate region,
wherein the at least one processor is further configured to cause the computer to control a print unit to execute printing on a print medium based on the output value generated by the processing.

2. The image processing apparatus according to claim 1, wherein the at least one processor is further configured to cause the computer to decide one of the plurality of processes as processing to be executed for each pixel included in the intermediate region,
wherein the at least one processor is configured to cause the computer to execute, for each pixel, the decided processing.

3. The image processing apparatus according to claim 2, wherein the at least one processor is configured to cause the computer to decide, for each pixel included in the intermediate region, one of the plurality of processes based on a probability.

4. The image processing apparatus according to claim 2, wherein using mask data which is formed by a predetermined number of pixels and in which one of the plurality of processes is assigned to each pixel, the at least one processor is configured to cause the computer to decide one of the plurality of processes as the processing to be executed for each pixel in the intermediate region.

5. The image processing apparatus according to claim 4, wherein the at least one processor is configured to cause the computer to use first mask data as the mask data for a region close to the first region among a plurality of positions included in the intermediate region, and use, as the mask data, second mask data different from the first mask data for a region close to the second region among the plurality of positions included in the intermediate region.

6. The image processing apparatus according to claim 5, wherein a number of pixels assigned with the first processing in the first mask data is larger than a number of pixels assigned with the first processing in the second mask data.

7. The image processing apparatus according to claim 6, wherein the number of pixels assigned with the second processing in the second mask data is larger than the number of pixels assigned with the second processing in the first mask data.

8. The image processing apparatus according to claim 4, wherein
the mask data is arranged in a tile pattern in an image represented by the multi-gradation image data, and
the at least one processor is configured to cause the computer to acquire, based on a pixel position of a pixel of the intermediate region in the multi-gradation image data, a pixel position of the pixel in the mask data, and decide, as processing to be executed for the pixel, one of the processes assigned to the acquired pixel position.

9. The image processing apparatus according to claim 4, wherein in the mask data, the pixels assigned with the first processing and the pixels assigned with the second processing are randomly distributed.

10. The image processing apparatus according to claim 4, wherein
after the processing is executed, quantization processing is executed, and
a distribution of the pixels assigned with the first processing and a distribution of the pixels assigned with the second processing in the mask data correspond to a distribution of thresholds of a threshold mask used in the quantization processing.

11. The image processing apparatus according to claim 1, wherein each of a probability of deciding the first processing and a probability of deciding the second processing corresponds to an occurrence probability of the random number.

12. The image processing apparatus according to claim 2, wherein the at least one processor is configured to cause the computer to decide one of the first processing and the second processing as the processing to be executed for each pixel in the intermediate region by associating the first processing and the second processing with binaries in an error diffusion model.

13. The image processing apparatus according to claim 1, wherein the at least one processor is configured to cause the computer to set the first region, the second region, and the intermediate region by executing edge detection processing for the multi-gradation image data.

14. The image processing apparatus according to claim 13, wherein the first region is an edge region, and the intermediate region and the second region are separated from the edge region in this order.

15. The image processing apparatus according to claim 1, wherein the first printing material and the second printing material are inks.

16. The image processing apparatus according to claim 15, wherein permeability of first ink to a predetermined type of print medium is lower than permeability of second ink to the predetermined type of print medium.

17. The image processing apparatus according to claim 1, wherein the multi-gradation image data is bitmap data.

18. The image processing apparatus according to claim 1, wherein the ratio of the pixels, for which the second processing is executed, included in the first region is 0.

19. The image processing apparatus according to claim 1, wherein the ratio of the pixels, for which the first processing is executed, included in the second region is 0.

20. The image processing apparatus according to claim 1, wherein the output value generated by the second processing indicates that the first printing material is not applied.

21. The image processing apparatus according to claim 1, wherein the output value generated by the second processing indicates that the first printing material is applied.

22. The image processing apparatus according to claim 1, wherein the first printing material has an achromatic color, and the second printing material has a chromatic color.

23. The image processing apparatus according to claim 1, wherein if a pixel is included in a character object, the at least one processor is configured to cause the computer to execute the first processing for the pixel.

24. The image processing apparatus according to claim 1, wherein in the intermediate region, a certain amount of first pixels and a certain amount of second pixels are included.

25. An image processing method, comprising:
executing rendering processing so as to acquire multi-gradation image data;
setting, in the acquired multi-gradation image data, a first region, a second region that does not contact the first region, and an intermediate region located between the first region and the second region; and
selectively executing, for each pixel in each of the first region, the second region, and the intermediate region, one of a plurality of processes, wherein the plurality of processes include first processing of generating an output value indicating that a first printing material is applied and a second printing material of a color different from a color of the first printing material is not applied, and second processing of generating an output value indicating that the second printing material is applied, wherein the first processing or the second processing is selectively executed for each pixel,
wherein a ratio of pixels, for which the first processing is executed, included in the first region is higher than a ratio of pixels, for which the first processing is executed, included in the second region, and is higher than a ratio of pixels, for which the first processing is executed, included in the intermediate region,
a ratio of pixels, for which the second processing is executed, included in the second region is higher than a ratio of pixels, for which the second processing is executed, included in the first region, and is higher than a ratio of pixels, for which the second processing is executed, included in the intermediate region, and
a ratio of pixels for which the first processing is executed at a first position is higher than a ratio of pixels for which the first processing is executed at a second position farther away from the first region than the first position in the intermediate region, and a ratio of pixels for which the second processing is executed at the second position is higher than a ratio of pixels for which the second processing is executed at the first position in the intermediate region,
using a random number to decide one of the plurality of processes as the processing to be executed for each pixel in the intermediate region,
executing printing on a print medium based on the output value generated by the processing.

26. A non-transitory computer-readable storage medium storing a program for causing a computer to operate to:
execute rendering processing so as to acquire multi-gradation image data;
set, in the acquired multi-gradation image data, a first region, a second region that does not contact the first region, and an intermediate region located between the first region and the second region; and
selectively execute, for each pixel in each of the first region, the second region, and the intermediate region, one of a plurality of processes, wherein the plurality of processes include first processing of generating an output value indicating that a first printing material is applied and a second printing material of a color different from a color of the first printing material is not applied, and second processing of generating an output value indicating that the second printing material is applied, wherein the first processing or the second processing is selectively executed for each pixel,
wherein a ratio of pixels, for which the first processing is executed, included in the first region is higher than a ratio of pixels, for which the first processing is executed, included in the second region, and is higher than a ratio of pixels, for which the first processing is executed, included in the intermediate region,
a ratio of pixels, for which the second processing is executed, included in the second region is higher than a ratio of pixels, for which the second processing is executed, included in the first region, and is higher than a ratio of pixels, for which the second processing is executed, included in the intermediate region, and a ratio of pixels for which the first processing is executed at a first position is higher than a ratio of pixels for which the first processing is executed at a second position farther away from the first region than the first position in the intermediate region, and a ratio of pixels for which the second processing is executed at the second position is higher than a ratio of pixels for which the second processing is executed at the first position in the intermediate region, causing the computer to use a random number to decide one of the plurality of processes as the processing to be executed for each pixel in the intermediate region, further causing the computer to control a print unit to execute printing on a print medium based on the output value generated by the processing.

\* \* \* \* \*